United States Patent
Cho et al.

(10) Patent No.: US 10,657,236 B2
(45) Date of Patent: May 19, 2020

(54) WEARABLE-TYPE ELECTRONIC DEVICE MOUNTED WITH FINGERPRINT RECOGNITION SENSOR

(71) Applicant: Samsung Electronics Co., Ltd., Suwon-si, Gyeonggi-do (KR)

(72) Inventors: Gyusang Cho, Seongnam-si (KR); Seunggeol Baek, Suwon-si (KR); Kyung-Hoon Song, Yongin-si (KR); Yunjang Jin, Yongin-si (KR); Kwangsub Lee, Yongin-si (KR); Min-Woo Yoo, Osan-si (KR); Chi-Hyun Cho, Yongin-si (KR); Jong-Chul Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 244 days.

(21) Appl. No.: 15/813,698

(22) Filed: Nov. 15, 2017

(65) Prior Publication Data

US 2018/0144113 A1    May 24, 2018

(30) Foreign Application Priority Data

Nov. 23, 2016 (KR) .......................... 10-2016-0156162

(51) Int. Cl.
*G06F 1/16* (2006.01)
*G06F 21/32* (2013.01)
(Continued)

(52) U.S. Cl.
CPC ............ *G06F 21/32* (2013.01); *G02B 6/0011* (2013.01); *G04B 47/06* (2013.01); *G04G 17/045* (2013.01);
(Continued)

(58) Field of Classification Search
CPC ................................. G06F 1/163; G02B 6/00
(Continued)

(56) References Cited

U.S. PATENT DOCUMENTS

| | | | | |
|---|---|---|---|---|
| 6,327,376 B1* | 12/2001 | Harkin | ................... | G01B 7/004 356/71 |
| 8,773,847 B2* | 7/2014 | Byun | .................... | H04B 1/385 361/679.03 |

(Continued)

FOREIGN PATENT DOCUMENTS

| EP | 2 068 212 A1 | 6/2009 |
|---|---|---|
| WO | 2015/161070 A2 | 10/2015 |
| WO | 2017/197337 A1 | 11/2017 |

*Primary Examiner* — Anthony Q Edwards
(74) *Attorney, Agent, or Firm* — Jefferson IP Law, LLP

(57) ABSTRACT

A wearable device that is mounted with a fingerprint recognition sensor is provided. The wearable device includes a housing including a first, a second face facing, and a third face facing, a support structure disposed between the first and second faces, a display disposed on the first face to be exposed, and including a window having a first flange and a second flange disposed to be opposite the first face, and a display module coupled to the window to face the second direction, the display being disposed on one face of the support structure, a printed circuit board disposed on another face of the support structure, at least one light emitter mounted adjacent to the first flange to emit light to a first region of the window, and at least one light receptor mounted adjacent to the second flange to receive light reflected from the first region.

20 Claims, 24 Drawing Sheets

(51) Int. Cl.
  *G04G 21/08* (2010.01)
  *G04G 17/04* (2006.01)
  *F21V 8/00* (2006.01)
  *G04B 47/06* (2006.01)
  *G06K 9/00* (2006.01)
  *G06K 19/07* (2006.01)
  *G06K 19/077* (2006.01)

(52) U.S. Cl.
  CPC ........... *G04G 21/08* (2013.01); *G06K 9/0004* (2013.01); *G06K 19/0718* (2013.01); *G06K 19/07749* (2013.01)

(58) Field of Classification Search
  USPC ...................................................... 361/679.03
  See application file for complete search history.

(56) References Cited

U.S. PATENT DOCUMENTS

| | | | | |
|---|---|---|---|---|
| 2003/0190062 A1* | 10/2003 | Noro | ...................... | A61B 5/022 382/124 |
| 2012/0206734 A1* | 8/2012 | Natsume | .............. | G06K 9/0004 356/611 |
| 2015/0010265 A1* | 1/2015 | Popovich | ............ | G02F 1/13342 385/10 |
| 2015/0146944 A1* | 5/2015 | Pi | ........................ | H04L 63/0861 382/124 |
| 2015/0310251 A1 | 10/2015 | Wyrwas et al. | | |
| 2016/0189579 A1* | 6/2016 | Sun | ...................... | G02B 27/017 345/671 |
| 2016/0203306 A1 | 7/2016 | Boshra | | |
| 2016/0203346 A1 | 7/2016 | Gardiner et al. | | |
| 2016/0205094 A1 | 7/2016 | Harthattu et al. | | |
| 2017/0090599 A1* | 3/2017 | Kuboyama | ............. | G06F 3/038 |
| 2017/0185234 A1* | 6/2017 | Zhang | ................... | G06F 3/0428 |
| 2017/0271546 A1* | 9/2017 | Hou | ...................... | G06K 9/00013 |
| 2017/0372152 A1* | 12/2017 | Baek | ..................... | A61B 5/0452 |
| 2018/0074352 A1* | 3/2018 | Popovich | .............. | G02F 1/1326 |
| 2018/0082101 A1* | 3/2018 | Zhang | ................... | G06F 3/0421 |
| 2018/0181733 A1* | 6/2018 | Shim | ..................... | G04G 21/08 |
| 2019/0026524 A1* | 1/2019 | Hou | ...................... | G06K 9/0004 |
| 2019/0227382 A1* | 7/2019 | Watanabe | ................. | F21S 2/00 |

* cited by examiner

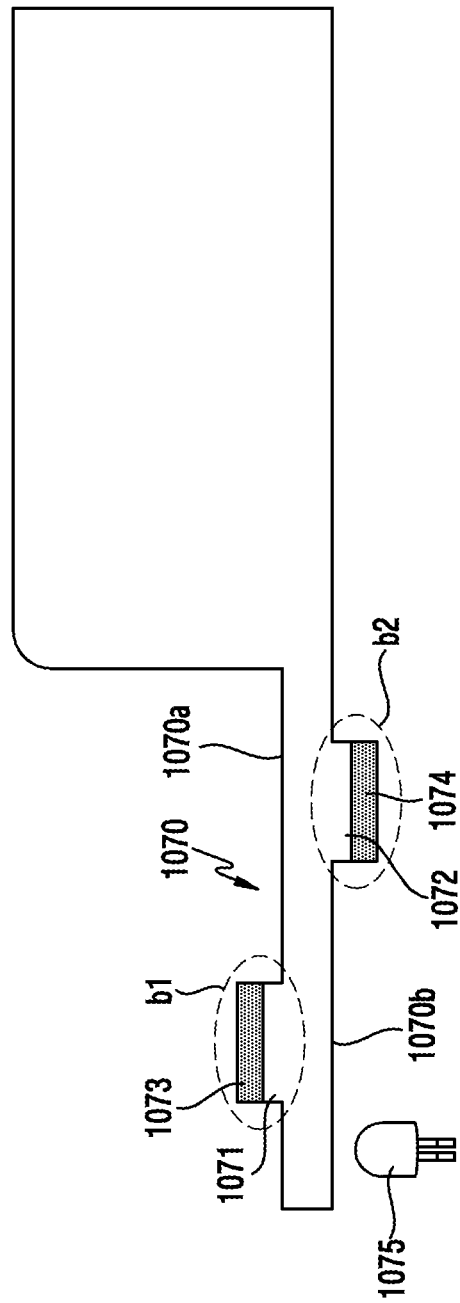

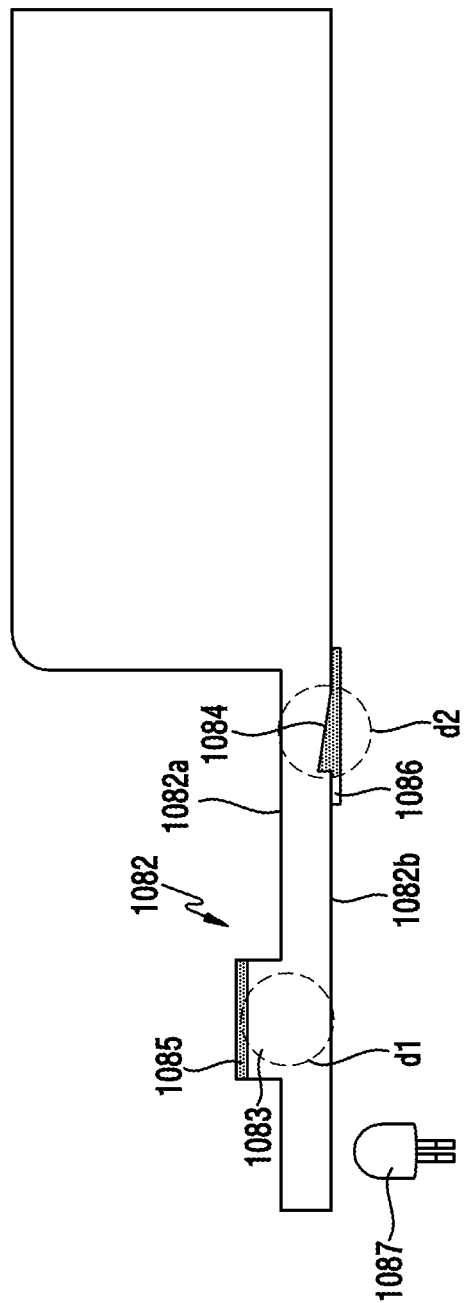

WEARABLE-TYPE ELECTRONIC DEVICE MOUNTED WITH FINGERPRINT RECOGNITION SENSOR

CROSS-REFERENCE TO RELATED APPLICATION(S)

This application claims the benefit under 35 U.S.C. § 119(a) of a Korean patent application filed on Nov. 23, 2016 in the Korean Intellectual Property Office and assigned Serial number 10-2016-0156162, the entire disclosure of which is hereby incorporated by reference.

TECHNICAL FIELD

The present disclosure relates to a mounting structure of a fingerprint recognition sensor mounted on a wearable device.

BACKGROUND

Payment methods using an electronic device, such as a smailphone, are gradually increasing. In a payment market environment using a smailphone, high security is required. For example, the payment market environment uses individual-specific information (e.g., fingerprint recognition or iris recognition), thereby being changed to an environment in which the security can be more trusted.

Furthermore, as the payment market has expanded to electronic devices such as smartphones, there is a growing demand for mounting fingerprint recognition sensors having high security in wearable-type electronic devices.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wearable device with a fingerprint recognition sensor.

However, since an electronic device to be worn at a predetermined position of a human body (for example, a wearable electronic device to be worn on a wrist) is not large in size like a portable electronic device, such as a smart phone, it is not easy to add a physical button (e.g., a home button), which is capable of recognizing a fingerprint, to a front face of the housing thereof.

In addition, when the fingerprint sensor is mounted on the rear face of a wearable device, the fingerprint sensor is seated on the wrist when the wearable device is worn, so that fingerprint recognition may not be performed in a normal situation.

Another aspect of the present disclosure is to provide a wearable device capable of providing a structure on which a fingerprint recognition sensor is mounted.

Another aspect of the present disclosure is to provide a wearable device that is capable of providing a structure for providing a fingerprint recognition region on a display active region and mounting a fingerprint recognition sensor on a flange of a window.

Another aspect of the present disclosure is to provide a wearable device in which a light-emitting portion of a fingerprint recognition sensor is mounted on the flange of a window so that the light-emitting portion may be disposed to be hidden to be invisible to the outside.

In accordance with an aspect of the present disclosure, an electronic device is provided. The electronic device includes a housing including a first face facing a first direction, a second face facing a second direction that is opposite the first direction, and a third face facing a third direction that is perpendicular to each of the first and second directions and enclosing at least a portion of a space between the first and second faces, a support structure disposed between the first and second faces, a display disposed on the first face to be exposed, and including a window having a first flange and a second flange disposed to be opposite the first face and a display module coupled to the window to face the second direction, the display being disposed on one face of the support structure, a printed circuit board disposed on another face of the support structure, at least one light emission unit mounted adjacent to the first flange to emit light to a first region of the window, and at least one light reception unit mounted adjacent to the second flange to receive light reflected from the first region.

In accordance with another aspect of the present disclosure, an electronic device is provided. The electronic device includes a housing including a first face facing a first direction, a second face facing a second direction that is opposite the first direction, and a third face facing a third direction that is perpendicular to each of the first and second directions and enclosing at least a portion of a space between the first and second faces, a pair of straps configured to enable the housing to be worn on a wrist, a display including a window disposed on the first face to be exposed and including a first flange and a second flange disposed to be opposite the first face, and a display module coupled to the window to face the second direction, and a fingerprint recognition sensor mounted on each of the first and second flanges. The fingerprint recognition member may include at least one light emission unit mounted adjacent to the first flange to emit light to a first region of the window, and at least one light reception unit mounted adjacent to the second flange to receive light reflected from the first region.

In accordance with another aspect of the present disclosure, since it is possible to mount a fingerprint recognition sensor on a wearable device to be worn on a wrist, the security of the wearable device can be improved, and as a result, the wearable device can be used for various purposes in fields of, for example, payment means.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 10A, 10B, and 10C are views illustrating various light refraction structures adopted in a fingerprint recognition sensor according to various embodiments of the present disclosure;

Throughout the drawings, it should be noted that like reference numbers are used to depict the same or similar elements, features, and structures.

DETAILED DESCRIPTION

Figure 1:
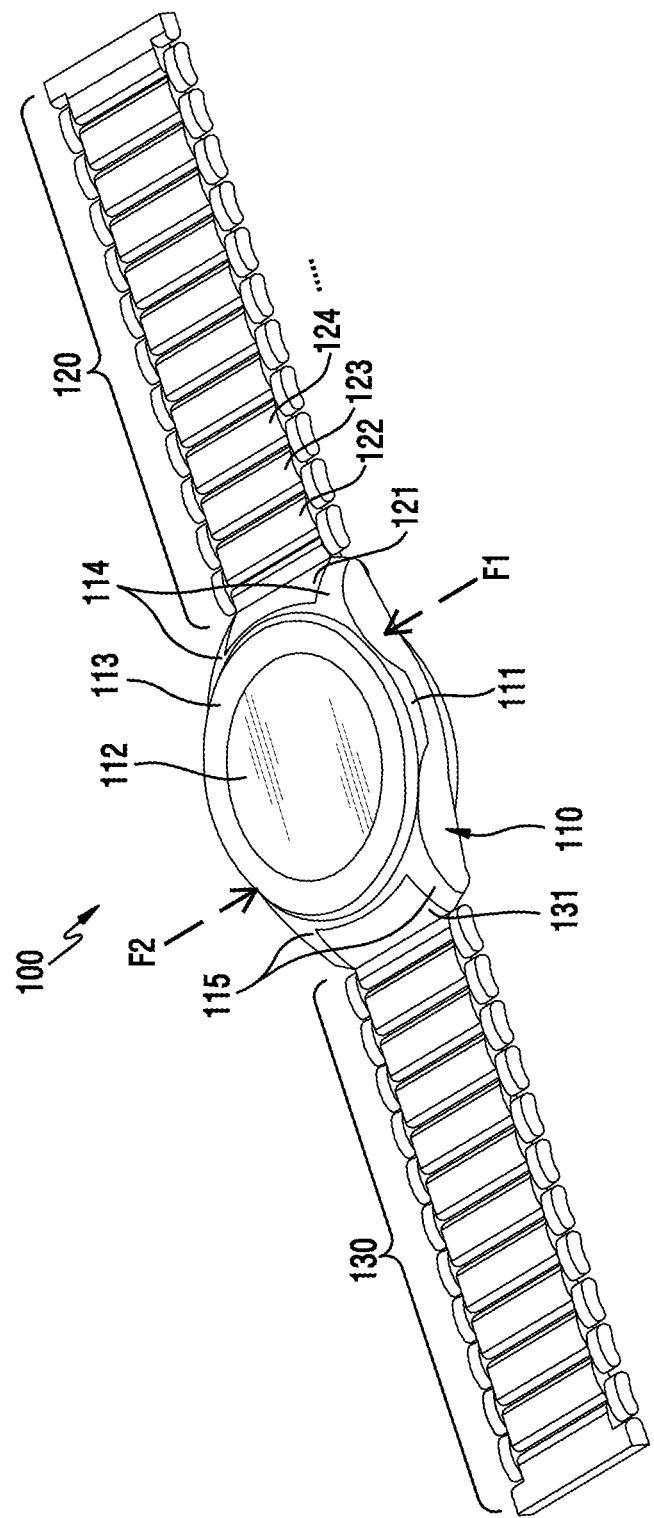
FIG. 1 is a perspective view illustrating a wearable electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Herein, the expressions "include", "may include" and other conjugates refer to the existence of a corresponding disclosed function, operation, or constituent element, and do not limit one or more additional functions, operations, or constituent elements. Further, "have", and their conjugates merely denote a certain feature, numeral, step, operation, element, component, or a combination thereof, and do not exclude the existence or possibility of addition of one or more other features, numerals, steps, operations, elements, components, or combinations thereof.

The expression "or" or "at least one of A or/and B" includes any or all of combinations of words listed together. For example, the expression "A or B" or "at least A or/and B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. Accordingly, a first element may be referred to as a second element, and likewise a second element may also be referred to as a first element, without departing from the scope of embodiments of the present disclosure.

When an element is referred to as being "coupled" or "connected" to any other element, it should be understood that not only may the element be coupled or connected directly to the other element, but also a third element may be interposed therebetween. Contrarily, when an element is referred to as being "directly coupled" or "directly connected" to any other element, it should be understood that no other element is interposed between the two elements.

The terms herein are used merely to describe one or more certain embodiments and are not intended to limit the present disclosure. As used herein, singular forms may include plural forms as well, unless the context explicitly indicates otherwise. Further, all terms used herein, including technical and scientific terms, have the same meaning as commonly understood by those of skill in the art to which the present disclosure pertains. Such terms as those defined in a generally used dictionary are to be interpreted to have the same meanings as the contextual meanings in the relevant field of art, and are not to be interpreted to have ideal or excessively formal meanings unless clearly defined in herein.

An electronic device according to the present disclosure may be a device including a communication function. For example, the electronic device may include at least one of a Smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an Motion Pictures Experts Group (Audio layer 2-Audio layer 3) (MP3) player, a mobile medical appliance, a camera, and a wearable device (e.g. a head-mounted-device, such as electronic glasses, electronic clothes, an electronic bracelet, an electronic necklace, an electronic appcessory, electronic tattoos, or a smartwatch).

The electronic device may also be a smart home appliance with a communication function such as a television (TV), a digital versatile disc (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

The electronic device may also include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM), and a point of sale (POS) device.

The electronic device may also include at least one of a part of furniture or a building/structure, an electronic board, an electronic signature receiving device, a projector, and various kinds of measuring instruments (e.g., a water meter, an electric meter, a gas meter, and a radio wave meter).

Further, the electronic device may be a flexible device.

The electronic device may also be a combination of one or more of the aforementioned various devices. Further, it will be apparent to those skilled in the art that the electronic device, according to the present disclosure, is not limited to the aforementioned devices.

Herein, the term "user" in may indicate a person who uses an electronic device or a device (e.g., an artificial intelligence electronic device) that uses an electronic device.

FIG. 1 is a perspective view illustrating a wearable electronic device according to various embodiments of the present disclosure.

Referring to FIG. 1, an electronic device 100 according to various embodiments of the present disclosure may be a wrist-wearable electronic device. According to various embodiments, the electronic device 100 may include a main body 110 and a pair of straps 120 and 130 (e.g., connection members, binding members, or chain members) mounted on the opposite ends of the main body 110, respectively. According to various embodiments, the electronic device 100 may be worn on a user's wrist in a manner in which the pair of straps 120 and 130 is wound around the wrist while the main body 110 is placed on the wrist. Of the pair of straps 120 and 130 according to various embodiments, one strap 120 may be provided with a buckle member (not illustrated), and the other strap 130 may be formed with a fastening member (not illustrated) to which the buckle member is fastened.

According to various embodiments, the main body 110 may include a housing 111. According to an embodiment, the housing 111 may be formed of a synthetic resin or a metal material. According to an embodiment, the main body 110 may include a display 112 disposed on the upper portion of the housing 111. According to an embodiment, the display 112 may be utilized as a touch screen device including a touch sensor. According to an embodiment, the display 112 may include a pressure sensor configured to sense the pressure applied to the exposed face of the display. According to an embodiment, the main body 110 may include an annular member 113 that is rotatably disposed in a manner of enclosing the display 112. According to an embodiment, the annular member 113 may be installed in a manner of enclosing at least a portion of the display 112 disposed in the housing 111. For example, the annular member may be referred to as a rotary wheel or an input wheel.

According to various embodiments, when the electronic device 100 is a wrist-wearable electronic device, the annular member may be disposed in a rotatable bezel manner. According to an embodiment, the annular member 113 may be rotated clockwise or counterclockwise, and the rotation amount may be limited up to 360 degrees or may be configured to rotate infinitely. According to an embodiment, the electronic device 100 may detect rotation parameters (e.g., a rotation direction, a rotation speed, and a rotation amount) of the annular member 113, and may perform a corresponding function based on the detected parameters.

According to various embodiments, the housing 111 may include at least one key button (not illustrated). According to the embodiment, a battery (e.g., a rechargeable battery or the like) may be applied to the electronic device 100 as a power supply unit within the electronic device 100, and a wireless charging coil member may be disposed in the electronic device 100 in order to charge the battery. According to an embodiment, the electronic device 100 may include at least one antenna device for communication. According to an embodiment, the antenna device may have at least one conductive pattern (e.g., antenna radiation pattern) that may be arranged inside the electronic device 100 in various ways. According to an embodiment, the electronic device 100 may be implemented to be selectively mounted on a predetermined portable charging cradle (e.g., a wired or wireless charging cradle) in order to charge the battery.

Although not illustrated, the housing 111 may include at least one sensor device disposed in at least a partial region of the housing 111. According to an embodiment, the sensor device may include at least one of a camera sensor, an infrared sensor, a heart rate monitor (HRM) sensor, an ultrasonic sensor, a photosensor, a proximity sensor, an illuminance sensor, a temperature sensor, and an iris recognition sensor.

According to various embodiments, the pair of straps 120 and 130 may include a first strap 120 and a second strap 130. According to an embodiment, the pair of straps 120 and 130 may be formed of a metal material. According to an embodiment, the first strap 120 may be fixed to a first strap fastening portion 114 on the housing 111. According to an embodiment, the second strap 130 may be fixed to a second strap fastening portion 115 on the housing 111.

According to various embodiments, the first strap 120 may include a plurality of unit links 121, 122, 123, 124, . . . connected to each other to be rotatably with respect to each other and each having a predetermined length to form the length of the first strap 120. According to an embodiment, the unit links 121, 122, 123, 124, . . . may be formed of a metal material, and may have the same length or different lengths. According to an embodiment, among the plurality of unit links, one unit link 121 disposed at one end may serve as a first coupling member 121 which is fastened to the first strap fastening portion on the housing 111. According to an embodiment, the first coupling member 121 may be fastened to the first strap fastening portion 114 on the housing by a hinge pin (e.g., 340 in FIG. 3B). According to an embodiment, the second strap 130 also includes a plurality of unit links by which the length of the second strap is formed like the first strap 120, and among the plurality of unit links, the unit link disposed at one end serves as a coupling member 131 which may be fastened to the second strap fastening portion 115 on the housing 111.

According to various embodiments, the electronic device 100 may be formed of a metal material for the purpose of reinforcing the rigidity and improving the design of the external appearance. In particular, the housing 111 formed of a metal material may be used as an antenna radiator by being electrically connected to a communication circuit disposed inside the housing in at least one region. According to an embodiment, the housing 111 may be used as a multi-band antenna radiator that operates in different frequency bands by being electrically connected to the communication circuit at different power feeding positions F1 and F2.

According to various embodiments, the electronic device 100 may be degraded in radiation characteristics by the metal straps 120 and 130 that are in physical contact with the housing 111 when the housing 111 is used as an antenna radiator. According to an embodiment, the housing 111 may be a metal housing, and the metal straps 120 and 130 may operate as undesired conductors of the metal housing 111 used as an antenna radiator, and as a result, the metal straps 120 and 130 may operate as undesired elements, by which the radiation direction of current may be distorted or the intensity of current may be lowered, and may operate as radiation inhibiting elements of the antenna radiator. According to an embodiment, in the electronic device 100, this problem may be solved by applying an insulating structure between the metal housing 111 and the metal straps 120 and 130.

Hereinafter, of the pair of strap fastening structures, only the fastening structure of any one strap fastening structure will described, but the fastening structure of the remaining strap may also be configured in the same manner. Further, the present disclosure may be applied to a strap fastening structure in which the opposite ends of one strap are fastened to first and second fastening portions on the housing, respectively, instead of the pair of straps.

Figure 2A:
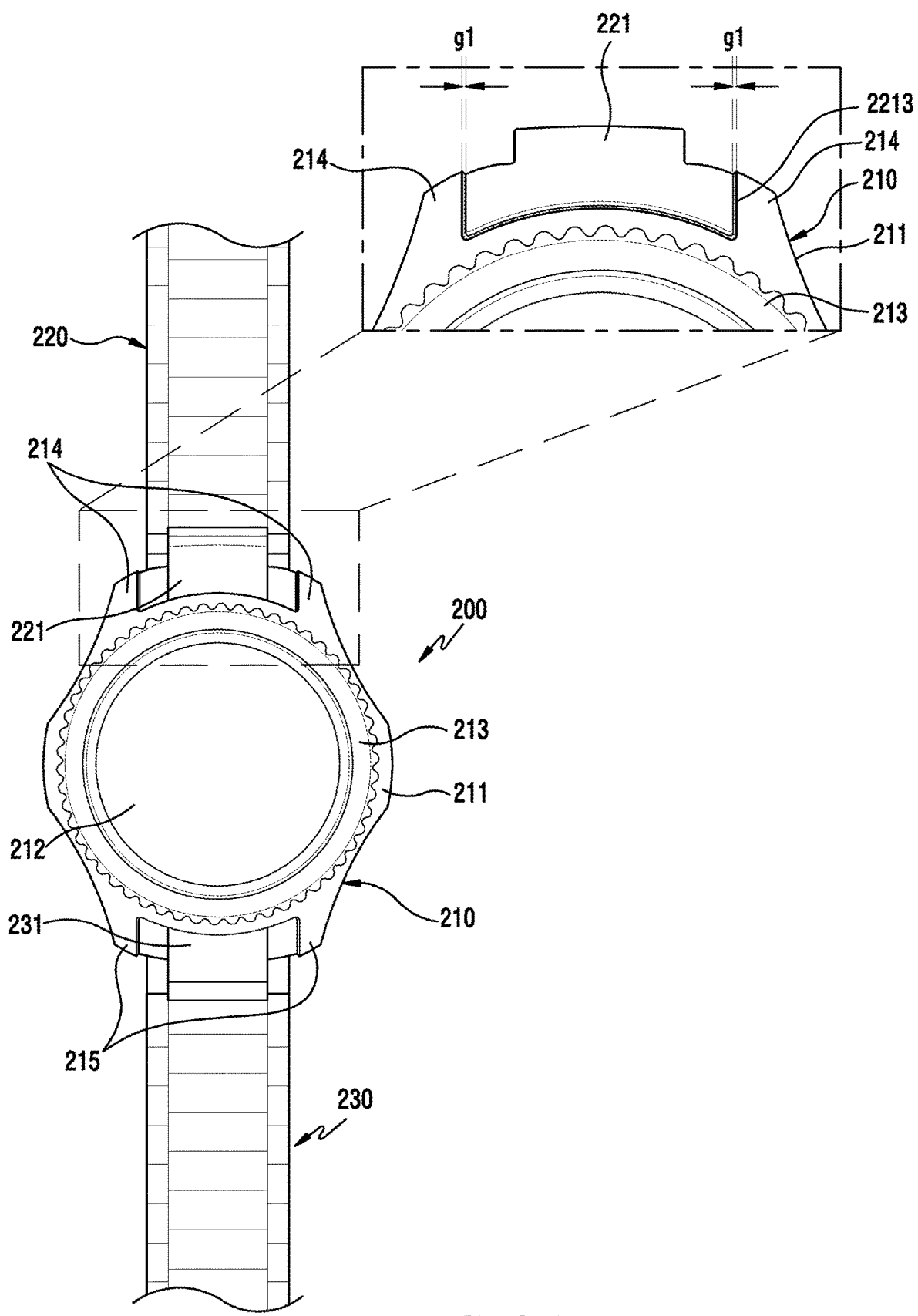
FIG. 2A is a view illustrating a connection structure between a main body and a strap of a wearable electronic device according to various embodiments of the present disclosure.

FIG. 2A is a view illustrating a configuration of a connection structure between the main body and the straps of a wearable electronic device according to various embodiments of the present disclosure.

Figure 2B:
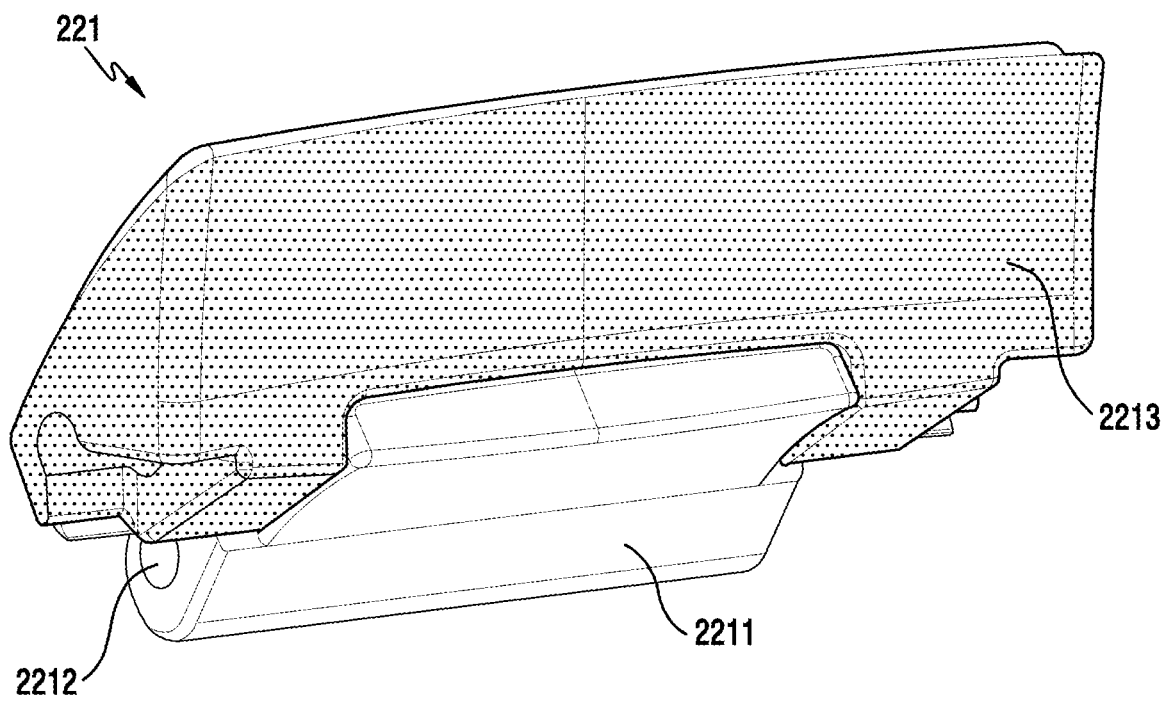
FIG. 2B is a perspective view illustrating a configuration of a coupling member of the strap according to various embodiments of the present disclosure.

FIG. 2B is a perspective view illustrating the configuration of the coupling member of the straps according to various embodiments of the present disclosure.

The electronic device 200 of FIGS. 2A and 2B may be at least partially similar to the electronic device 100 of FIG. 1, or may include other embodiments of the electronic device.

Referring to FIG. 2A, the electronic device 200 may include a main body 210 including a metal housing 211 and a pair of straps 220 and 230 disposed at the opposite ends of the main body 210, respectively. According to an embodiment, the main body 210 may include a display 212 and an annular member 213 that may perform functions similar to those described above. According to an embodiment, one strap 220 may be coupled in such a manner that a first coupling member 221 disposed at an end thereof is fastened to the first strap fastening portion 214 on the metal housing 211. The remaining strap 230 may be coupled in such a manner that the second coupling member 231 disposed at the end thereof is fastened to the second strap fastening portion 215 on the metal housing 211. According to an embodiment, in the electronic device 200, at least a partial region of the metal housing 211 may be used as an antenna radiator that operates in at least one frequency band by being electrically connected with a communication circuit.

According to various embodiments, the electronic device 200 may be configured to prevent an electric contact between the metal housing 211 and the first strap 220 made of a metal by including a non-conductive member 2213 interposed between the coupling member 221 disposed at the end of the first strap 220 and the first strap fastening portion 214 on the metal housing 211. According to an embodiment, a gap g1 of a predetermined spacing is formed between the contact faces of the first strap coupling portion 214 on the metal housing 211 and the first coupling member 221 by the non-conductive member 2213, so that it is possible to prevent an electrical contact between the metal housing 211 and the first strap 220 in advance.

According to various embodiments, the non-conductive member 2213 may include at least one of a rubber, urethane, silicon, and a synthetic resin (e.g., PC). According to an embodiment, the non-conductive member 2213 may be disposed on one of the contact face of the first coupling member 221 on the first strap 220 and the contact face on the first strap coupling portion 214 on the metal housing 211. According to an embodiment, the non-conductive member 2213 may be disposed in at least one of the methods of being attached, molded, dually injection-molded, and applied to the first strap coupling portion 214 on the metal housing 211 and/or the coupling member 221 on the first strap 220.

According to various embodiments, the second coupling member 231 on the second strap 230 may include a non-conductive member to be disconnected from the electrical connection to the second strap fastening portion 215 on the metal housing 211, like the first strap 220.

Referring to FIG. 2B, the non-conductive member 2213 may be disposed on the coupling member 221. According to an embodiment, the coupling member 221 may include a body 2211 including a hinge pin through hole 2212 and the non-conductive member 2213 disposed in at least a partial region of an outer face of the body 2211. According to an embodiment, the non-conductive member 2213 may be disposed such that the coupling member 221 covers the contact face with which the coupling member 221 covers the contact face that is in contact with the strap fastening portions (e.g., the fastening portions or the first strap coupling portion 214 and 215 in FIG. 2A) on the metal housing (e.g., the metal housing 211 in FIG. 2A). According to an embodiment, the non-conductive member 2213 may include at least one of a rubber, urethane, silicone, and a synthetic resin (e.g., PC). According to an embodiment, the non-conductive member 2213 may be disposed in at least one of the methods of being attached, molded, dually injection-molded, and applied to the contact face that is in contact with the strap fastening portions (e.g., the fastening portions 214 and 215 in FIG. 2A) in the metal housing (e.g., the metal housing 211 in FIG. 2A) of the outer face of the body 2211 of the coupling member 221.

Figure 3:
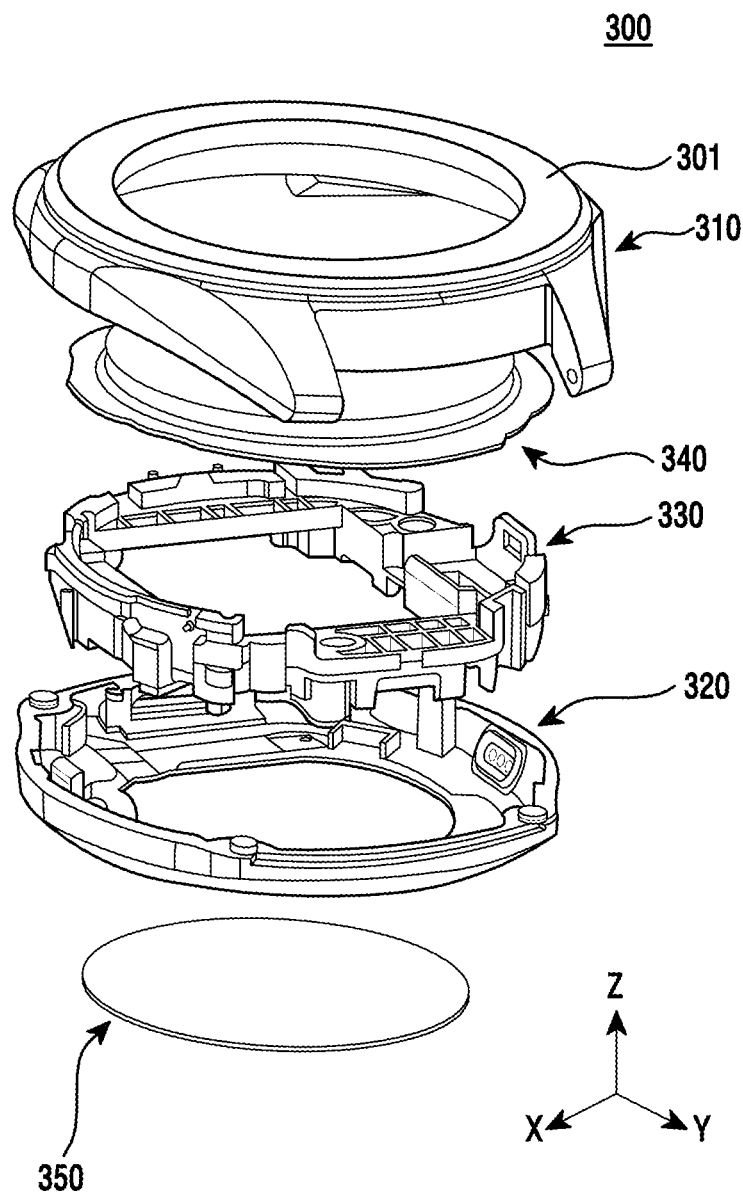
FIG. 3 is an exploded perspective view illustrating an internal configuration of the wearable electronic device according to various embodiments of the present disclosure.

FIG. 3 is an exploded perspective view illustrating an internal configuration of a wearable-type electronic device 300 according to various embodiments of the present disclosure. FIG. 3 illustrates an orthogonal coordinate system in which an X axis is the transverse direction of the electronic device 300, a Y axis is the longitudinal direction of the electronic device 300, and a Z axis is the thickness direction of the electronic device 300.

Referring to FIG. 3, according to various embodiments, the electronic device 300 may be the same wearable electronic device as the electronic device 100 illustrated in FIG. 1. According to various embodiments, the wearable electronic device 300 may include a display 340, a housing 310 and 320, and a cover 350, which are associated with the exterior, and may include a support structure 330 that is accommodated inside the housing 310 and 320 and supports various components.

According to various embodiments, in the electronic device 300, various electronic components may be fixed in the state of being supported on the support structure 330, the support structure 330 is accommodated in the housing 310 and 320 (e.g., the housing is formed by a front case 310 and a rear case 320). A first external appearance component (e.g., the window of the display 340) is mounted on one face of the housing 310 and 320, and a second external appearance component (e.g., the cover 350) may be coupled to the other face of the housing.

According to various embodiments, the housing may include a front case 310 and a rear case 320. The front case 310 and the rear case 320 may be coupled to each other in the vertical direction, thereby forming a single housing.

According to various embodiments, the housing 310 and 320 may form the external appearance of the electronic device 300, may protect a plurality of various components, and may be at least partially made of a metal material so as to perform an antenna radiator function. According to various embodiments, the assembly of the electronic device 300 may be completed by vertically coupling the support structure 330 on which various components are mounted to the housing 320 and vertically coupling the display 340 to the housing 320 to which the support structure 330 is coupled.

According to various embodiments, the housing 310 and 320 may include a first face that faces the first direction, a second face that faces the second direction, and a third face that faces a third direction perpendicular to the first and second directions and encloses at least a portion of a space between the first and second faces. When the first direction is oriented to the upper side, the first face may be the front face of the housing, and when the second direction is oriented to the lower side, the second face may be the rear face of the housing. The front face may be the upper surface of the front case 310, and the rear face may be the rear face of the rear case 320. The front case 310 and the rear case 320 are vertically coupled to each other, and the support structure 330 may be received therein by the mutual coupling. The support structure 330 may have a first external appearance member disposed on the upper face that faces the first direction and a second external appearance member disposed on the rear surface that faces the second direction.

According to various embodiments, the support structure 330 may be, for example, a support bracket, a support member, or an inner support that supports a plurality of electronic components. According to various embodiments, the support structure 330 may be disposed within the electronic device 300, and may be used as a component for strengthening the overall rigidity of the electronic device. For example, at least one of Aluminum (Al), Manganese (Mg), and stainless steel (STS) may be used for the support structure 330. According to various embodiments, for the support structure 330, a high-rigidity plastic containing glass fiber may be used, or a metal and a plastic may be used together. According to various embodiments, when a metal material and a non-metal material are used together as the material of the support structure 330 (e.g., an inner portion thereof), the support structure 330 may be formed in the molding, and the non-metal material may be formed on the metal material in the manner of insert injection molding.

According to an embodiment, between the display 340 and the front case 310, sheets (such as, an elastic member (e.g., a sponge or a rubber) and an adhesive layer (e.g., a double-sided tape or a single-sided tape)) may be additionally disposed so as to protect the display 340.

According to various embodiments, a plurality of support structures 330 may be configured, in which a first structure may be configured to support the display 340 and a substrate (see FIG. 4), and the like, and a second structure may be configured to support other members. For example, the second structure may be configured to support and protect other components, such as a battery (see FIG. 4).

According to various embodiments, the rear cover 350 is a member that is disposed on the second face of the housing 320 to be exposed, and may be made of a synthetic resin material or a glass material. For example, the rear cover 350 may be made of a transparent material or a translucent or opaque material.

The front case 310 of the housing according to various embodiments may include a rotary wheel 301 on the outer face thereof. The rotary wheel 301 may be an input device that rotates to input desired data.

Figure 4:
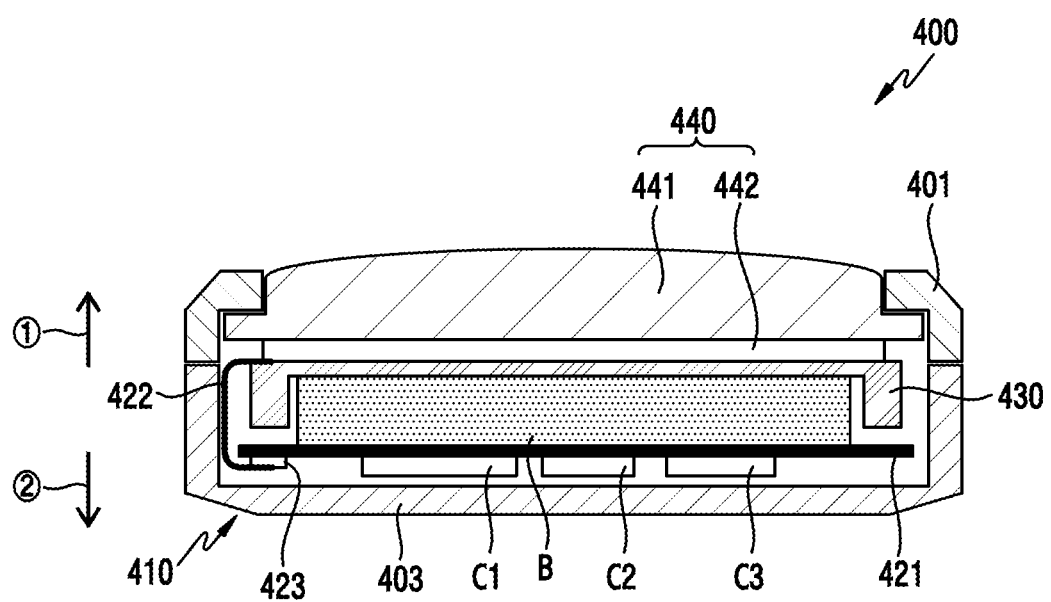
FIG. 4 is a cross-sectional view illustrating the internal configuration of the wearable electronic device according to various embodiments of the present disclosure.

FIG. 4 is a cross-sectional view illustrating the internal configuration of the wearable electronic device according to various embodiments of the present disclosure.

Referring to FIG. 4, the internal structure of the electronic device 400 according to various embodiments may include a housing 410 formed by coupling a front case and a rear case to each other. According to various embodiments, the housing 410 may include a display 440 disposed on the first face thereof that faces a first direction and a rear cover 403 disposed to be exposed on the second face thereof that faces a second direction. According to various embodiments, a window 441 may be coupled to the housing 410, and the rear cover 403 may be coupled to the housing 410. For example, the upper end face of the front case may be configured as a bezel region of the electronic device. A rotary wheel 401 may be coupled to the housing, for example, the front case of the housing. The rotary wheel 401 may be disposed on the outer circumferential face of the upper end of the housing 410 to perform various input operations according to the rotating operation.

According to various embodiments, a support structure 430 may be disposed between the first and second faces of the housing. According to various embodiments, the display 440 may be supported on one face of the support structure 430 that faces the first direction, and a battery B and a printed circuit board 421 may be supported on the other face of the support structure 430 that faces the second direction.

According to various embodiments, the printed circuit board 421 may be disposed between the battery B positioned to face the first direction and the rear cover 403 positioned to face the second direction. For example, various electronic components C1, C2, and C3 may be mounted on the one face and the other face of the printed circuit board 421.

According to various embodiments, in the electronic device 400, the display 440, the support structure 430, the battery B, the printed circuit board 421, and the back or rear cover 403 may be disposed to be sequentially stacked in the housing 410. However, the stacked structure in the electronic device is not limited thereto, and may be changed.

According to various embodiments, in the electronic device 400, the display 440 and the printed circuit board 421 may be electrically connected to each other by an electrical connection device 422. For example, the electrical connection device 422 may include a flexible printed circuit board. The electrical connection device 422 may be referred to as a display flexible circuit board, and may be electrically connected to the printed circuit board 421 by a slim connector 423.

The display 440 may include a window 441 and a display device or display module 442, and only the window 441 may be disposed to be exposed to the external appearance. For example, the window 441 may be made of a transparent synthetic resin or a glass material. The display module 442 may include a touch-sensitive panel (TSP). When the display module 442 includes the TSP, the display module 442 may be referred to as a touch screen.

Hereinafter, descriptions will be made of a mounting structure of a fingerprint recognition sensor according to various embodiments of the present disclosure with reference to the accompanying drawings.

Figure 5:
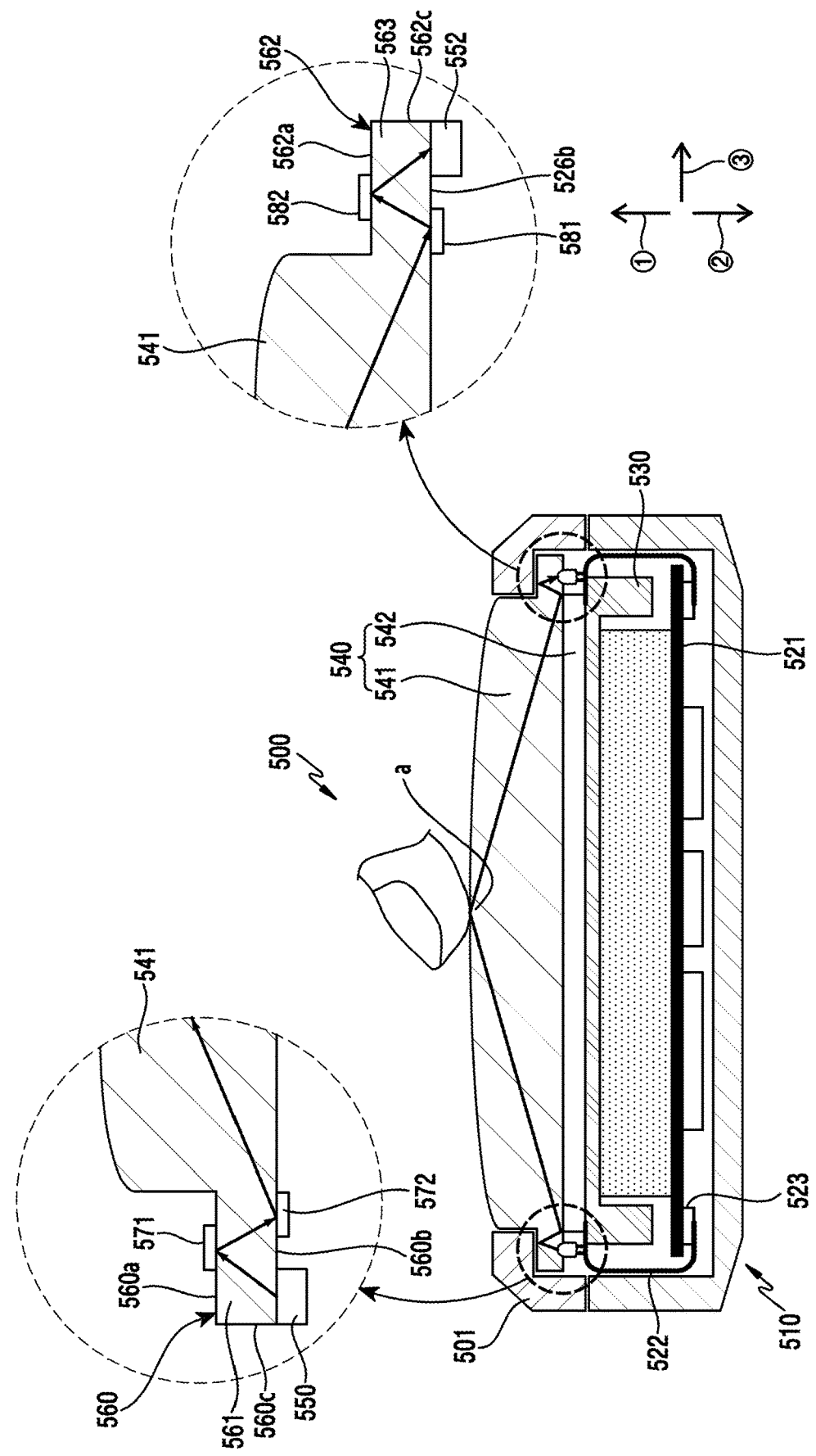
FIG. 5 is a cross-sectional view illustrating the internal configuration of a wearable electronic device equipped with a fingerprint recognition sensor, in which a main portion is illustrated in an enlarged scale, according to various embodiments of the present disclosure.

FIG. 5 is a cross-sectional view illustrating the internal configuration of a wearable electronic device equipped with a fingerprint recognition sensor, in which a main portion is illustrated in an enlarged scale, according to various embodiments of the present disclosure.

Referring to FIG. 5, according to various embodiments, an electronic device 500 may be configured to be the same as the electronic device 400 illustrated in FIG. 4, excepted for the fingerprint recognition device. Thus, the detailed descriptions of the housing 510, the support structure 530, the display module 542, the printed circuit board 521, and the electrical connection device 522, which constitute the electronic device 500 according to various embodiments, will be omitted.

According to various embodiments, a rotary wheel 501 may be coupled to the housing, for example, the front case of the housing. The rotary wheel 501 may be disposed on the outer circumferential face of the upper end of the housing 510 to perform various input operations according to the rotating operation.

According to various embodiments, the display 540 may include a window 541 and a display module 542. According to various embodiments, the display 540 may be configured such that the window 541 and the display module 542 are stacked one on another and the window 541 is exposed to the outside at the outermost periphery.

According to various embodiments, the window 541 may be exposed in a first direction and the display module 542 is assembled in a window 541 to face a second direction and may be oriented on one face of the support structure 530 that faces the first direction. For example, the window 541 may be made of a glass material or a transparent synthetic resin material. The window 541 made of such a material may provide an optical waveguide function, which will be described later.

According to various embodiments, the window 541 may include one or more outer circumferential portions 560 and 562 extending in the outer circumferential direction. The outer circumferential portion may be at least one portion extending from the window body in the outer circumferential direction.

According to various embodiments, the outer circumferential portion may include a plurality of flanges, and may include, for example, a first flange 560 and a second flange 562 that is opposite the first flange 560. The first and second flanges 560 and 562 may face the rotary wheel 501, and may be arranged to be stacked with the rotary wheel 501.

According to various embodiments, the first flange 560 may include one or more light emission units 550 (e.g., light emitters). The light emission units 550 may emit light to the first region a of the window 541. According to various embodiments, the second flange 562 may be located at a position opposite the first flange 560 across the first region a, and may include one or more light reception units 552 (e.g., light receptors). The light reception unit 552 can receive pattern light reflected from the first region a. Each of the light emission units 550 corresponds to one of the light reception units 552, and each light emission unit 550 and each light reception unit 552 may operate as one sensor. According to various embodiments, the light emission unit 550 and the light reception unit 552 may constitute a fingerprint recognition sensor using infrared near infra-red (NIR), etc.

According to various embodiments, the first flange 560 may include a first waveguide 561 (waveguide) as at least a portion of the window hidden by the rotary wheel. The light emitted from the light emission units 550 may be reflected at least once in the first waveguide 561 and then guided to the first region a. According to various embodiments, the second flange 562 may include a second waveguide 563 as at least a portion of the window 541 that is hidden by the rotary wheel 501. The pattern light reflected from the first region a may be received by the light reception units 552 after being reflected at least once in the second waveguide 563. For example, the light emitted from the first waveguide 561 may be guided to the first region a in the state of being trapped, and the light reflected by the first region a may be guided in the state of being trapped in the second waveguide 563.

According to various embodiments, the first flange 560 may include a first outer circumferential face 560a that faces the first direction, a second outer circumferential face 560b that faces the second direction opposite the first direction, and a third outer circumferential face 560c that faces a third direction perpendicular to each of the first and second directions. The first and second outer circumferential faces 560a and 560b may face each other, and the third outer circumferential face 560c may enclose at least a portion of a space between the first and second outer circumferential faces 560a and 560b. The first outer circumferential face 560a may be the upper face of the first flange 560, the second outer circumferential face 560b may be the lower face of the first flange 560, and the third outer circumferential face 560c may be the side face of the first flange 560. The outer circumferential portion enclosed by the first to third outer circumferential faces 560a to 560c may be the first waveguide 561.

According to various embodiments, the second flange 562 may include a fourth outer circumferential face 562a that faces the first direction, a fifth outer circumferential face 562b that faces the second direction opposite the first direction, and a sixth outer circumferential face 562c that faces the third direction perpendicular to each of the first and second directions. The fourth and fifth outer circumferential faces 562a and 562b may face each other, and the sixth outer circumferential face 562c may enclose at least a portion of a space between the fourth and fifth outer circumferential faces 562a and 562b. The fourth outer circumferential face 562a may be the upper face of the second flange, the fifth outer circumferential face 562b may be the lower face of the second flange, and the sixth outer circumferential face 562c may be the side face of the second flange. The outer circumferential portion enclosed by the fourth to sixth outer circumferential faces 562a to 562c may be the second waveguide 563.

According to various embodiments, first reflection structures 571 and 572 are disposed between the first to third outer circumferential faces 560a to 560c, and second reflection structures 581 and 582 are disposed between the fourth to sixth outer circumferential faces 562a to 562c.

According to various embodiments, the first reflection structures may include one or more light reflection members 571 and 572. The first reflection structures may include at least one first reflection member 571 disposed on the first outer circumferential face 560a and at least one second reflection member 572 disposed on the second outer circumferential face 560b. The light emitted from the light emission units 550 is reflected and guided by the first reflection member 571 and the reflected light may be reflected by the second reflection member 572 to be guided to the first region a. The first and second reflecting members 571 and 572 may be simple reflection plates such as mirrors, or plate or sheet-shaped members having different refractive indexes, respectively.

According to various embodiments, the second reflection structures may include one or more light reflection members 581 and 582. The second reflection structures may include at least one third reflection member 581 disposed on the fifth outer circumferential face 562b and at least one fourth reflection member 582 disposed on the fourth outer circumferential face 562a. The light emitted from the first region a is reflected by the third reflection member 581, and the reflected light may be guided to the light reception units 552 by the fourth reflection member 582.

According to various embodiments, the light emission units 550 may be provided on or may be disposed adjacent to the first outer circumferential face 560a of the first flange 560. The light emission units 550 may be provided on or may be disposed adjacent to the second outer circumferential face 560b. The light emission units 550 may be provided on or may be adjacent to the third outer circumferential face 560c. According to various embodiments, the light reception units 552 may be provided on or may be disposed adjacent to the first outer circumferential face 562a of the first flange 562. The light reception units 552 may be provided on or may be disposed adjacent to the second outer circumferential face 562b. The light reception units 552 may be provided on or may be disposed adjacent to the third outer circumferential face 562c.

According to various embodiments, the first region a may be the central region of the window 541, i.e., the center region of the first face exposed in the first direction. For example, the first region a may be a region on which a fingerprint is imprinted (touched), so that light passing through the first region a may be a pattern light or a fingerprint pattern light in which a pattern called a fingerprint is formed.

Figure 6A:
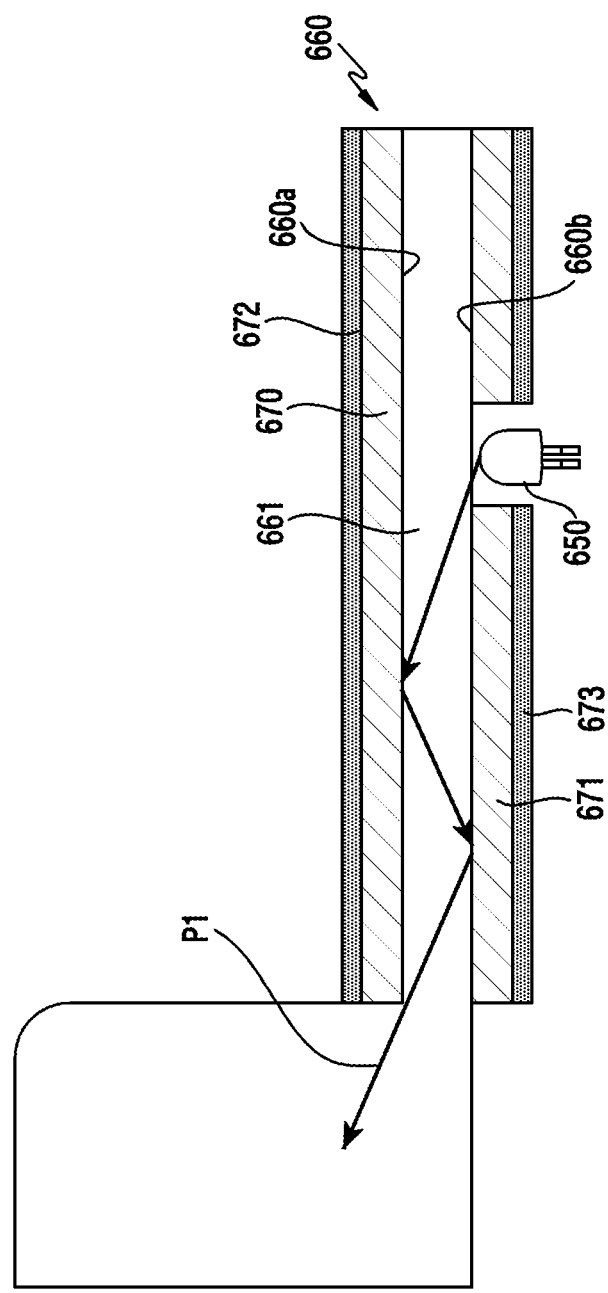
FIG. 6A is a cross-sectional view illustrating a reflection structure of a light emission unit provided in a first flange according to various embodiments of the present disclosure.

FIG. 6A is a cross-sectional view illustrating a reflection structure 641 of a light emission unit provided in a first flange according to various embodiments of the present disclosure.

Referring to FIG. 6A, according to various embodiments, the first reflection structure may include a first metal layer 670 deposited on a first outer circumferential face 660a in a first direction, and a second metal layer 671 deposited on a second outer circumferential face 660b in a second direction. For example, each of the first and second metal layers 670 and 671 may function as a reflection layer or an optical element, such as a reflection member (e.g., a mirror), and may function to reflect incident light at a predetermined angle, for example, to change a light path p1.

According to various embodiments, the first metal layer 670 may be formed on at least a portion of the first outer circumferential face 660a. For example, the first metal layer 670 may be formed to entirely cover the first outer circumferential face 660a. According to various embodiments, the second metal layer 671 may be formed on at least a portion of the second outer circumferential face 660b. For example, the second metal layer 671 may be formed to entirely cover the second outer circumferential face 660b.

According to various embodiments, when light is emitted at a predetermined angle from a light emission unit 650 (e.g., light emitter), the emitted light is guided so as to be reflected by the first metal layer 670, and the reflected light may be reflected by the second metal layer 671 so as to be guided to the first region. However, when the light emission unit 650 is disposed adjacent to the second outer circumferential face 660b of the first flange 660, the second metal layer 671 may be removed from the region where the light emission unit 650 is to be disposed.

According to various embodiments, the material of each of the first and second metal layers 670 and 671 may include one of Sn, Ag, Au, Ni, and Co, or a combination thereof.

According to various embodiments, the first metal layer 670 may further include a first light-shielding layer 672 in the first direction. At least a portion of the first light-shielding layer 672 may be formed on the first metal layer 670. For example, the first light-shielding layer 672 may be formed in a black or gray color series. The first light-shielding layer 672 may be formed by a printing method to have a predetermined thickness on the first metal layer 670.

According to various embodiments, the second metal layer 671 may further include a second light-shielding layer 673 in the second direction. For example, the second light-shielding layer 673 may be formed in a black or gray color series. At least a portion of the second light-shielding layer 673 may be formed on the second metal layer 671. The second light-shielding layer 673 may be formed by a printing method to have a predetermined thickness on the second metal layer 671.

Figure 6B:
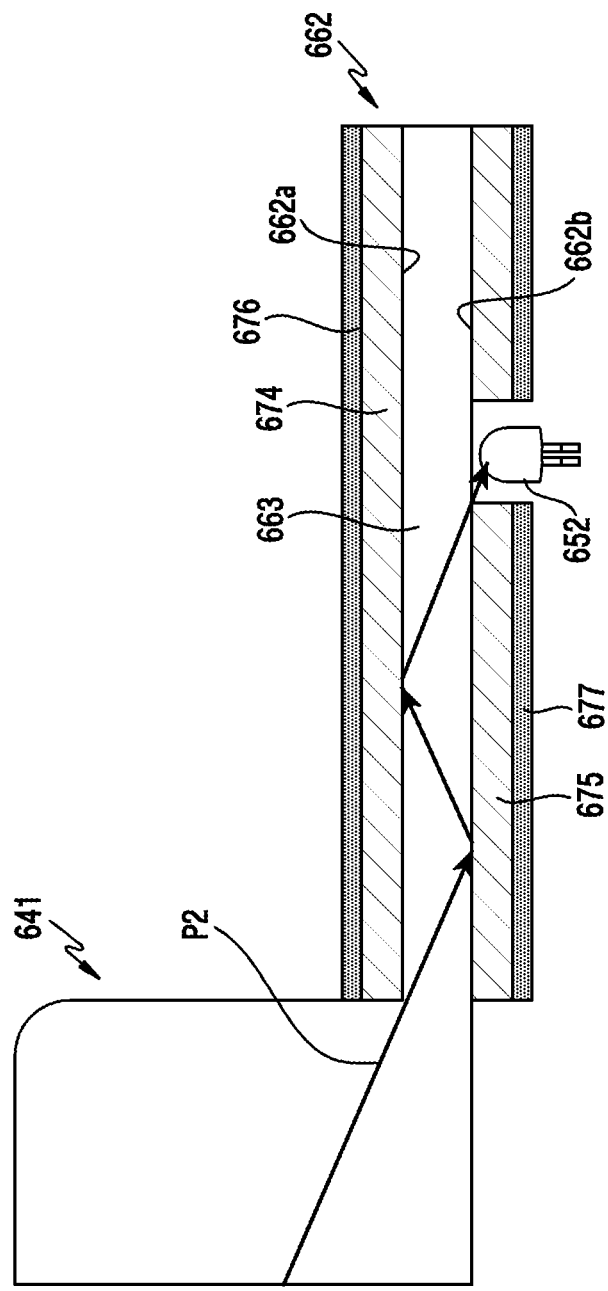
FIG. 6B is a cross-sectional view illustrating a reflection structure of a light reception unit provided in a first flange according to various embodiments of the present disclosure.

FIG. 6B is a cross-sectional view illustrating a reflection structure of a light reception unit provided in a first flange according to various embodiments of the present disclosure.

Referring to FIG. 6B, according to various embodiments, the second reflection structure may include a third metal layer 674 deposited on a fourth outer circumferential face 662a in the first direction, and a fourth metal layer 675 deposited on a fifth outer circumferential face 662b in the second direction. For example, each of the third and fourth metal layers 674 and 675 may function as a reflection layer or an optical element, such as a reflection member (e.g., a mirror), and may function to reflect guided light at a predetermined angle, for example, to change a light path.

According to various embodiments, when the light reflected from the first region of the window is guided at a predetermined angle, the guided light is reflected by the fourth metal layer 675, and the reflected light may be reflected by the third metal layer 674 so as to be received by the light reception unit 652 (e.g., light receptor). However, when the light reception unit 652 is disposed adjacent to the second flange 662, the fourth metal layer 675 may be removed from the region where the light reception unit 652 is to be disposed.

According to various embodiments, the material of each of the third and fourth metal layers 674 and 675 may include one of Tin (Sn), Silver (Ag), Gold (Au), Nickel (Ni), and Cobalt (Co), or a combination thereof.

According to various embodiments, the third metal layer 674 may further include a third light-shielding layer 676 in the first direction. For example, the third light-shielding layer 676 may be formed in a black or gray color series. The third light-shielding layer 676 may be formed by a printing method to have a predetermined thickness on the third metal layer 674. According to various embodiments, the fourth metal layer 675 may further include a fourth light-shielding layer 677 in the second direction. For example, the fourth light-shielding layer 677 may be formed in a black or gray color series. The fourth light-shielding layer 677 may be formed by a printing method to have a predetermined thickness on the fourth metal layer 675.

Figure 7A:
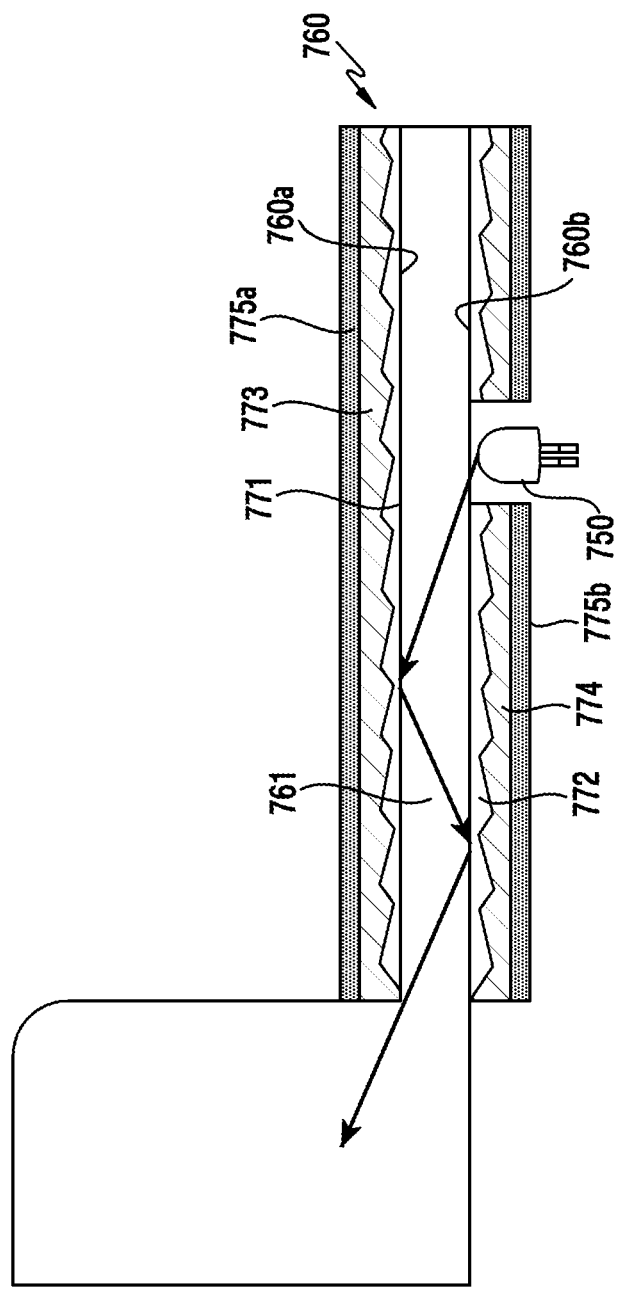
FIG. 7A is a cross-sectional view illustrating another reflection structure of the light emission unit provided in the first flange according to various embodiments of the present disclosure.

FIG. 7A is a cross-sectional view illustrating another reflection structure 741 of the light emission unit provided in the first flange according to various embodiments of the present disclosure. For example, the various layers may function as a reflection layer or an optical element, such as a reflection member, and may function to reflect incident light at a predetermined angle, for example, to change a light path p3.

Referring to FIG. 7A, according to various embodiments, the first reflection structure provided in the first flange 760 may include a first ultra-violet (UV) molding layer 771 formed on the first outer circumferential face 760a in the first direction. The first UV molding layer 771 may be made of a transparent material having a first refractive index, and may be formed with a concavo-convex pattern having an angle on the surface facing the first direction. For example, the concavo-convex pattern may be formed in a three-dimensional shape, and may serve to enhance the optical refraction of incident light.

According to various embodiments, the first metal layer 773 may be formed on the surface of the first UV molding layer 771, which faces the first direction. The first metal layer 773 may be formed with a concavo-convex pattern having an angle on the surface facing the second direction. The first UV molding layer 771 formed on the first outer circumferential face 760a may perform an optically refracting or coloring function. The first UV molding layer 771 may be manufactured by depositing a transparent coating material on the first outer circumferential face 760a to a thickness of about 100 μm, then semi-curing the coating material with ultraviolet light, and imprinting the concavo-convex pattern with a mold. Alternatively, the first outer circumferential face 760a may be wet-etched so as to form a concave-convex pattern. For example, the first UV molding layer 771 may be deposited in the form of a separate layer, or may be integrally formed on the first outer circumferential face 760a of the first flange 760 by injection molding.

According to various embodiments, a second UV molding layer 772 may be formed on the second outer circumferential face 760b of the first flange 760 in the second direction. The second UV molding layer 772 may be made of a transparent material having a first refractive index, and may be formed with a concavo-convex pattern having an angle on the surface facing the second direction. According to various embodiments, the second metal layer 774 may be formed on the surface of the second UV molding layer 772, which faces the second direction. The second metal layer 774 may be formed with a concavo-convex pattern having an angle on the surface facing the first direction. The second UV molding layer 772 formed on the second outer circumferential face 760b may perform an optically refracting or coloring function. The second UV molding layer 772 may be manufactured by depositing a transparent coating material on the second outer circumferential face 760a to a thickness of about 100 μm, then semi-curing the coating material with ultraviolet light, and imprinting the concavo-convex pattern with a mold. Alternatively, the second outer circumferential face 760b may be wet-etched so as to form a concave-convex pattern. For example, the second UV molding layer 772 may integrally formed on the second outer circumferential face 760b of the first flange 760 by injection molding.

According to various embodiments, the first reflection structure provided on the first flange 760 may include a first pattern metal layer 773 (e.g., first metal layer) deposited on the first outer circumferential face 760a in the first direction, and a second pattern metal layer 774 (e.g., second metal layer) deposited on the second outer circumferential face 760b in the second direction. For example, each of the first and second patterned metal layers 773 and 774 has a concavo-convex pattern, and each of the first and second patterned metal layers 773 and 774 may function as a reflection layer so as to reflect incident light at a predetermined angle. Each of the first and second patterned metal layers 773 and 774 has a concavo-convex pattern, so that a light path directed to the first region can be secured. The first pattern metal layer 773 may be formed with a concavo-convex pattern having an angle on the surface facing the second direction. The second pattern metal layer 774 may be formed with a concavo-convex pattern having an angle on the surface facing the first direction.

According to various embodiments, the first pattern metal layer 773 may be positioned to face the second direction of the second UV molding layer 771 and may be formed with a pattern corresponding to the pattern formed on the first UV molding layer 771 (e.g., a concavo-convex shape). According to various embodiments, the second pattern metal layer 774 may be positioned to face the first direction of the second UV molding layer 772 and may be formed with a pattern corresponding to the pattern formed on the second UV molding layer 772 (e.g., a concavo-convex shape).

Each of the first and second UV molding layers 771 and 772 may function to adjust the reflection angle of light according to the provided pattern shape. According to the reflection adjustment of the pattern of each of the first and second UV molding layers 771 and 772, the mechanical length adjustment of the first flange 760 may be enabled.

According to various embodiments, when light is emitted at a predetermined angle from a light emission unit 750 (e.g., light emitter), the emitted light is guided so as to be reflected by the face of the first pattern metal layer 773, which faces the second direction, and the reflected light may be guided and then reflected by the second pattern metal layer 774 so as to be guided to the first region. According to various embodiments, the material of each of the first and second metal layers 773 and 774 may be made of one of Sn, Ag, Au, Ni, and Co, or a combination thereof. The first and second light-shielding layers 775a and 775b illustrated in FIG. 7A have the same configurations as those of the first and second light-shielding layers 672 and 673 illustrated in FIG. 6A, and will not be described in detail.

Figure 7B:
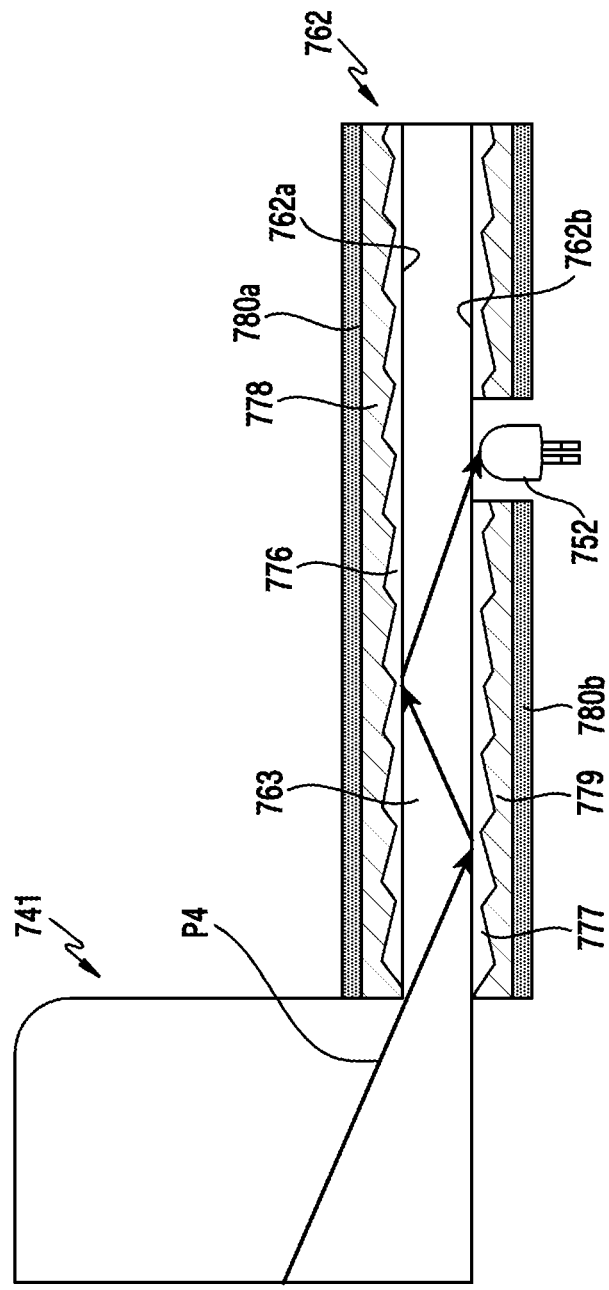
FIG. 7B is a cross-sectional view illustrating another reflection structure of the light reception unit provided in the first flange according to various embodiments of the present disclosure.

FIG. 7B is a cross-sectional view illustrating another reflection structure of the light reception unit provided in the first flange according to various embodiments of the present disclosure.

Referring to FIG. 7B, according to various embodiments, the second reflection structure of the second flange 762 may include a third UV molding layer 776 formed on the fourth outer circumferential face 762a in the first direction. The third UV molding layer 776 may be made of a transparent material having a first refractive index, and may be formed with a concavo-convex pattern having an angle on the surface facing the first direction. For example, the concavo-convex pattern may be formed in a two-dimensional shape, and may serve to enhance the optical refraction of incident light.

According to various embodiments, the third metal layer 778 may be formed on the surface of the third UV molding layer 776, which faces the first direction. The third pattern metal layer 778 (e.g., third metal layer) may be formed with a concavo-convex pattern having an angle on the surface facing the second direction. The third UV molding layer 776 formed on the fourth outer circumferential face 762a may perform an optically refracting or coloring function. The third UV molding layer 776 may be manufactured by depositing a transparent coating material on the fourth outer circumferential face 762a to a thickness of about 100 μm, then semi-curing the coating material with ultraviolet light, and imprinting the concavo-convex pattern with a mold. Alternatively, the fourth outer circumferential face 762a may be wet-etched so as to form a concave-convex pattern. For example, the third UV molding layer 776 may integrally formed on the fourth outer circumferential face 762a of the second flange by injection molding.

According to various embodiments, the fifth outer circumferential face 762b may be formed with a fourth UV molding layer 777 in the second direction. The fourth UV molding layer 777 may be made of a transparent material having a first refractive index, and may be formed with a concavo-convex pattern having an angle on the surface facing the second direction. According to various embodiments, the fourth pattern metal layer 779 may be formed on the surface of the fourth UV molding layer 777, which faces the first direction. The fourth pattern metal layer 779 may be formed with a concavo-convex pattern having an angle on the surface facing the first direction. The fourth UV molding layer 777 formed on the fifth outer circumferential face 762b may perform an optically refracting or coloring function. The fourth UV molding layer 777 may be manufactured by depositing a transparent coating material on the fifth outer circumferential face 762b to a thickness of about 100 μm, then semi-curing the coating material with ultraviolet light, and imprinting the concavo-convex pattern with a mold. Alternatively, the fifth outer circumferential face 762b may be wet-etched so as to form a concave-convex pattern. For example, the fourth UV molding layer 777 may integrally formed on the fifth outer circumferential face 762b of the second flange by injection molding.

Each of the third and fourth UV molding layers 776 and 777 may function to adjust the reflection angle of light according to the provided pattern shape. According to the reflection adjustment of the pattern of each of the third and fourth UV molding layers 776 and 777, the mechanical length adjustment of the first flange 760 may be enabled.

According to various embodiments, the guided light p4 may be reflected by the fourth metal pattern layer 779, and the reflected light may be reflected by the third pattern metal layer 778 so as to be received by the light reception unit 752 (e.g., light receptor). According to various embodiments, the material of each of the third and fourth metal layers 778 and 779 may be made of one of Sn, Ag, Au, Ni, and Co, or a combination thereof.

The third and fourth light-shielding layers 780a and 780b illustrated in FIG. 7B have the same configurations as those of the third and fourth light-shielding layers 676 and 677 illustrated in FIG. 6B, and will not be further described in detail.

Hereinafter, various arrangements of one or more light emission units and light reception units disposed to be adjacent to the first and second flanges, to be spaced apart from the first and second flanges, or to be in contact with the first and second flanges will be described.

Figure 8:
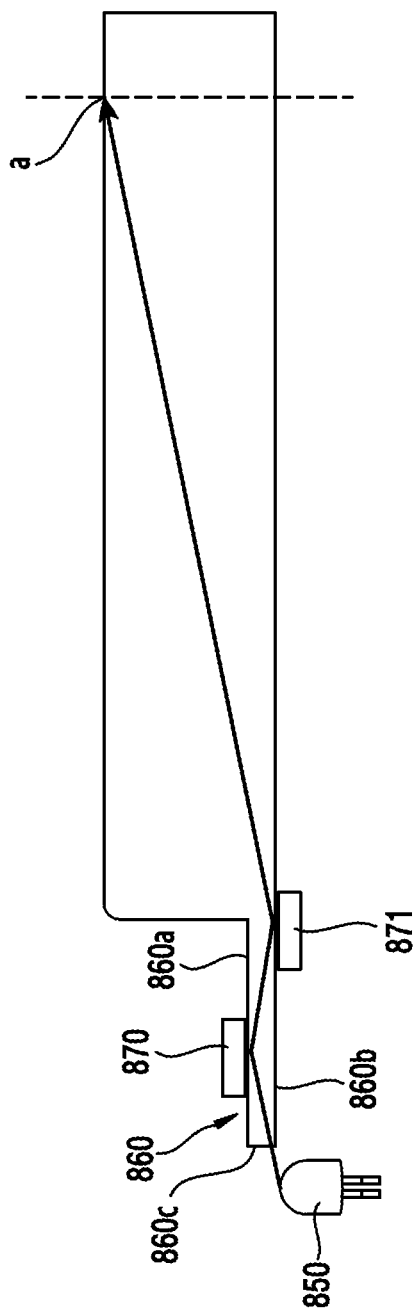
FIG. 8 is a view schematically illustrating an arrangement state of a light emission unit adopted in the fingerprint recognition sensor according to various embodiments of the present disclosure.

FIG. 8 is a view schematically illustrating an arrangement state of a light emission unit adopted in the fingerprint recognition sensor according to various embodiments of the present disclosure.

Referring to FIG. 8, according to various embodiments, a light emission unit 850 (e., light emitter) may be disposed to be spaced apart from the first flange 860, and may be disposed adjacent to the first flange 860 in consideration of the light-incident angle to the first flange 860. For example, the light emitted from the light emission unit 850 may be incident on one of first to third outer circumferential faces 860a to 860c of the first flange. FIG. 8 illustrates an example in which the light emitted from the light emission unit 850 is incident on the third outer circumferential face 860c.

According to various embodiments, the light emitted from the light emission unit 850 may be reflected by the first reflecting structure 870 disposed on the first outer circumferential face 860a and the reflected light may be reflected by the second reflection structure 871 and then may be guided to the first region a.

Figure 9:
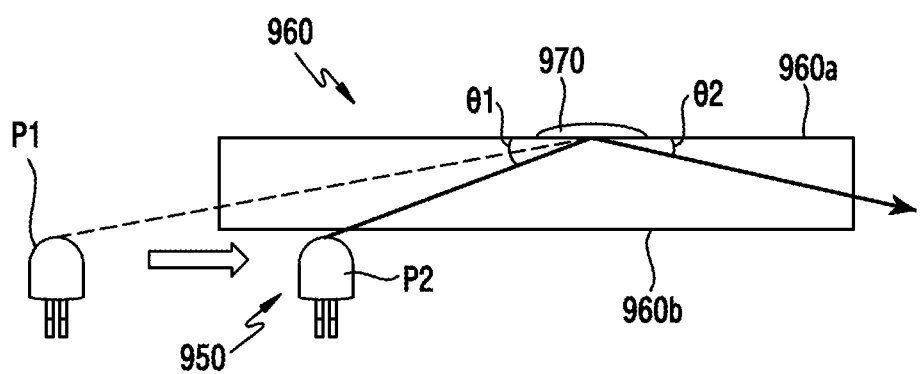
FIG. 9 is a view schematically illustrating an arrangement state of a light refraction structure adopted in the fingerprint recognition sensor according to various embodiments of the present disclosure.

FIG. 9 is a view schematically illustrating an arrangement state of a light refraction structure adopted in in the fingerprint recognition sensor according to various embodiments of the present disclosure.

Referring to FIG. 9, according to various embodiments, the reflection structure may include a light refraction structure 970 that is disposed on a first outer circumferential face 960a of a first flange 960 such that the position of a light emission unit 950 may be changed from a first position P1 to the second position P2. The second position P2 may be a position below the second outer circumferential face 960b, or may be a position downwardly adjacent to the second outer circumferential face 960b. The light refraction structure 970 may be configured to have a refractive index different from that of the first flange 960. For example, the incident angle θ1 of light emitted from the light emission unit 950 by the light refraction structure 970 may be larger than a reflection angle θ2. Depending on the position and refractive index of the light refraction structure 970, the position of the light emission unit 950 may be adjusted.

The structure of the light refraction structure according to various embodiments will be described with reference to FIGS. 10A to 10C.

Figure 10B:
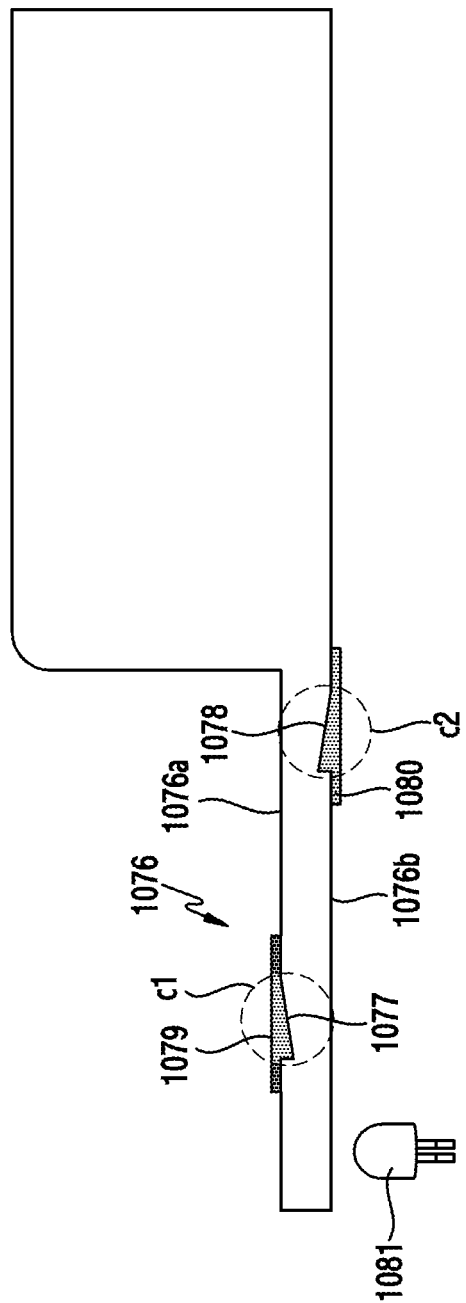

FIGS. 10A to 10C are views illustrating various light refraction structures adopted in a fingerprint recognition sensor according to various embodiments of the present disclosure.

Referring to FIG. 10A, according to various embodiments, the light refraction structure may be configured such that only portions b1 and b2 at which reflection is required on the first flange 1070 are thickened. For example, one or more of portions b1 and b2 at which reflection is required may be formed on the first outer circumferential face 1070a, and one or more of portions b1 and b2 at which reflection is required may be formed on the second outer circumferential face 1070b.

In the portion b1, at which reflection is required, a thick portion formed on the first outer circumferential face 1070a will be referred to as a "first refraction portion 1071" and a thick portion formed on the second outer circumferential face 1070b will be referred to as a "second refraction portion 1072." Light emitted from the light emission unit 1075 (e.g., light emitter) may be reflected by the first refraction portion 1071, and the reflected light may be reflected by the second refraction portion 1072 so as to be guided to the first region.

According to various embodiments, the first refraction portion 1071 may further include a first reflection sheet 1073 for total reflection. According to various embodiments, the second refraction portion 1072 may further include a second reflection sheet 1074 for total reflection. The first and second reflection sheets 1073 and 1074 may be attached to the first and second refraction portions 1071 and 1072, respectively.

Referring to FIG. 10B, according to various embodiments, the light refraction structure may be configured by etching only the portions c1 and c2 at which reflection is required on the first flange 1076. In FIG. 10A, only the portions b1 and b2 at which reflection is required are made thick, whereas, in FIG. 10B, only the portions c1 and c2 at which reflection is required may be formed through etching, and the etched portions c1 and c2 may be formed in various shapes. By the etched portion, an optical path may be changed and the arrangement position of the light emission unit may be adjusted.

According to various embodiments, the light refraction structure may include at least one first etched portion 1077 formed on the first outer circumferential face 1076a and at least one second etched portion 1078 formed on the second outer circumferential face 1076b. Light emitted from the light emission unit 1081 may be reflected by the first etched portion 1077, and the reflected light may be reflected by the second etched portion 1078 so as to be guided to the first region.

According to various embodiments, the first etched portion 1077 may further include a first reflection sheet 1079. The second etched portion 1078 may further include a second reflection sheet 1080. The first and second reflection sheets 1079 and 1080 may be attached to the first and second etched portions 1077 and 1078, respectively.

The light refraction structure illustrated in FIG. 10C may be a light refraction structure obtained by combining the light refraction structures of FIGS. 10A and 10B.

Referring to FIG. 10C, according to various embodiments, the light refraction structure may include a refraction portion 1083 formed by thickening only a portion d1 in which reflection is required on the first outer circumferential face 1082a of the first flange 1082, and an etched portion 1084 formed by etching only a portion at which reflection is required on the second outer circumferential face 1082b of the first flange. For example, at least one portion d1 at which reflection is required may be formed so as to form at least one refraction portion 1083 on the first outer circumferential face 1082a, and at least one etched portion 1084 may be formed on the second outer circumferential face 1082b (e.g., for at portion d2). Otherwise, the refraction portion 1083 may be disposed on the second outer circumferential face 1082b, and the etched portion 1084 may be disposed on the first outer circumferential face 1082a.

Light emitted from the light emission unit 1087 (e.g., light emitter) may be reflected by the refraction portion 1083, and the reflected light may be reflected by the etched portion 1084 so as to be guided to the first region of the window.

According to various embodiments, the refraction portion 1083 may further include a first reflection sheet 1085 for total reflection. According to various embodiments, the refraction portion 1084 may further include a second reflection sheet 1086 for total reflection. The first and second reflection sheets 1085 and 1086 may be attached to the refraction portion 1083 and the etched portion 1084, respectively.

Hereinafter, various arrangement structures of light emission units will be described with reference to the accompanying drawings.

Figure 11:
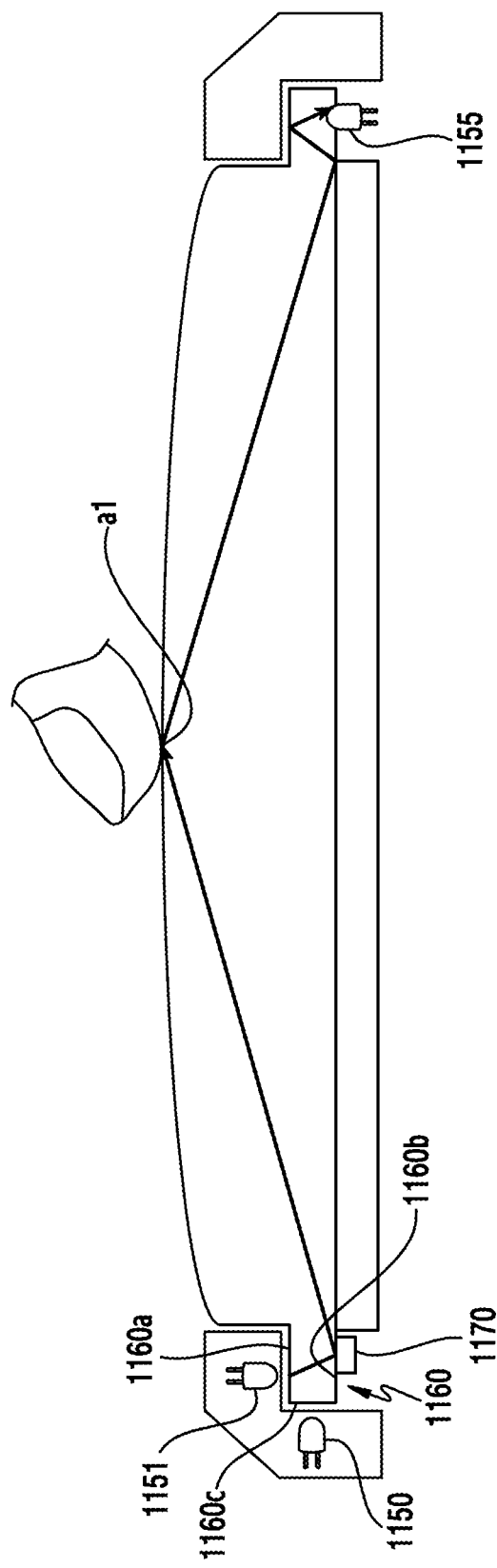
FIG. 11 is a view illustrating an arrangement state of light emission units according to various embodiments of the present disclosure.

FIG. 11 is a view illustrating an arrangement state of light emission units according to various embodiments of the present disclosure.

Referring to FIG. 11, according to various embodiments, a light emission unit 1150 (e.g., light emitter) may be disposed to face the third outer circumferential face 1160c of the first flange 1160, and may be disposed to face the third outer circumferential face 1160c and to be adjacent to the third outer circumferential face 1160c. Light emitted from the light emission unit 1150 may be reflected by the reflection member 1170 disposed on the second outer circumferential face 1160b so as to be guided to the first region a1, may be reflected from the first region a1, and may then be received by a light reception unit 1155. A light outlet portion (direction) of the light emission unit 1150 may be disposed to face the third outer circumferential face 1160c.

As another example, according to various embodiments, a light emission unit 1151 may be disposed to face the first outer circumferential face 1160a of the first flange 1160, and may be disposed to face the first outer circumferential face 1160a and to be adjacent to the first outer circumferential face 1160a. Light emitted from the light emission unit 1151 may be reflected by the reflection member 1170 disposed on the second outer circumferential face 1160b so as to be guided to the first region a1, may be reflected from the first region a1, and may then be received by the light reception unit 1155. A light outlet portion (direction) of the light emission unit 1151 may be disposed to face the first outer circumferential face 1160a.

Figure 12:
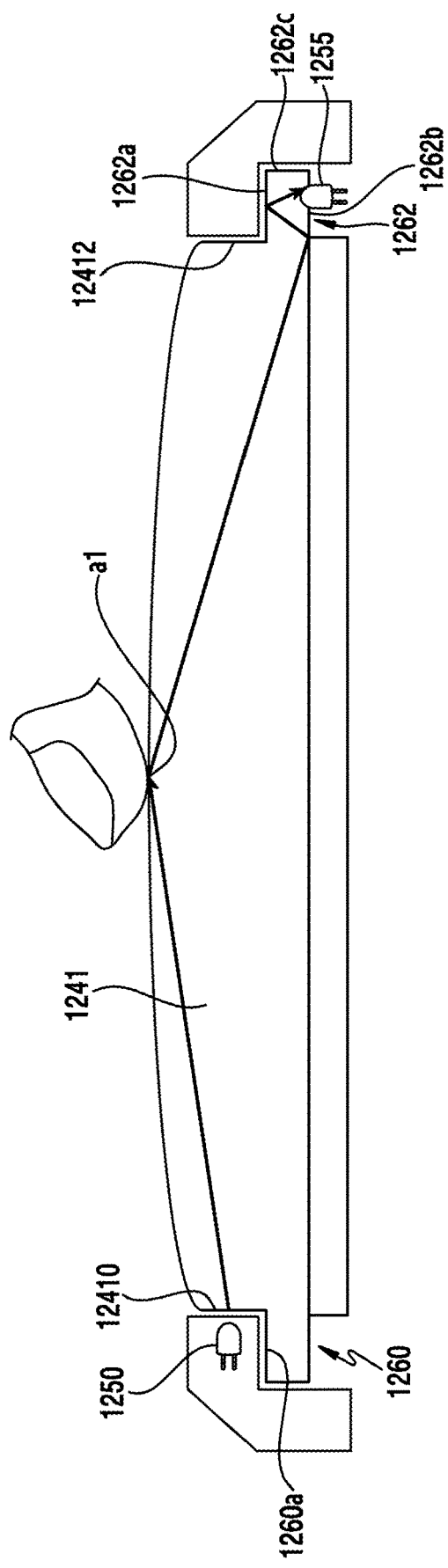
FIG. 12 is a view illustrating another arrangement state of light emission units according to various embodiments of the present disclosure.

FIG. 12 is a view illustrating another arrangement state of light emission units according to various embodiments of the present disclosure.

Referring to FIG. 12, according to various embodiments, a light emission unit 1250 (e.g., light emitter) may be disposed adjacent to the side surface 12410 of a window 1241. That is, the light emission unit 1250 may be disposed on the first outer circumferential face 1260a of the first flange 1260, and may be disposed to face a side face 12410 of the window 1241. Light emitted from the light emission unit 1250 is directly incident on the side face 12410 of the window, and the incident light may be guided to the first region and may then be reflected so as to be received by the light reception unit 1255. The light outlet portion of the light emission unit 1250 may be disposed to face and to be adjacent to the side face 12410 of the window. For example, the arrangement position of the light reception unit 1255 is not limited to a position below the second outer circumferential face of the second flange 1262, but may be disposed on any one of the fourth to sixth outer circumferential faces 1262a to 1262c of the second flange 1262, and may be disposed to face the other side face 12412 of the window.

Figure 13:
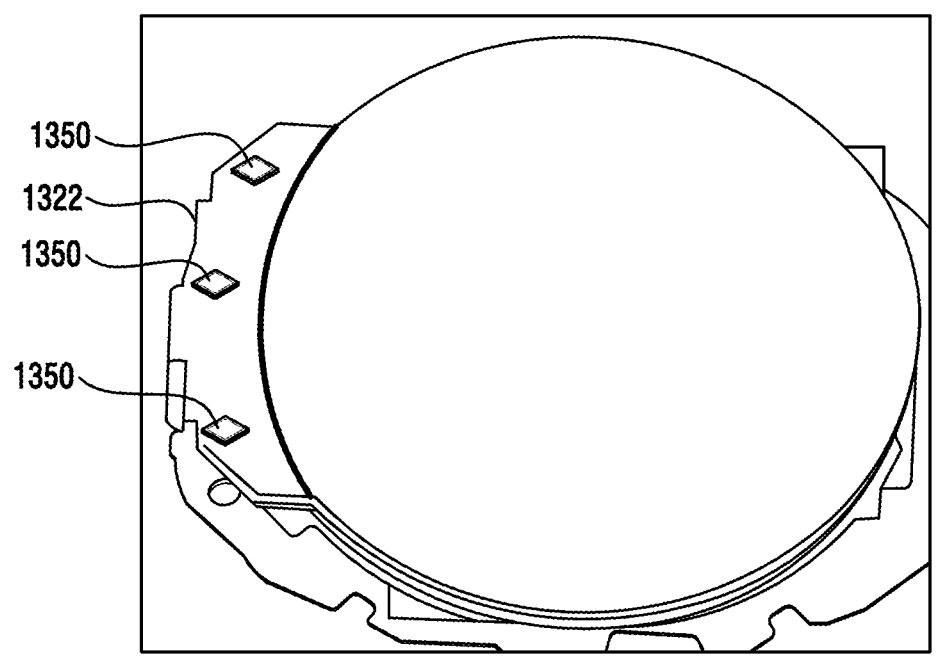
FIG. 13 is a perspective view illustrating a plurality of light emission units arranged on a display flexible printed circuit board (FPCB) according to various embodiments of the present disclosure.

FIG. 13 is a perspective view illustrating a plurality of light emission units arranged on a display flexible printed circuit board (FPCB) according to various embodiments of the present disclosure.

Referring to FIG. 13, according to various embodiments, one or more light emission units 1350 (e.g., light emitters) may be disposed on a display FPCB 1322. The light emission units 1350 may be arranged to be spaced apart from each other. For example, the light emission units 1350 may be mounted on the display FPCB 1322 in an SMT manner. The FPCB 1322 may be used in order to electrically connect a display disposed on the electronic device to a main printed circuit board, and the one or more light emission units 1350 may be directly mounted on the display FPCB 1322.

Figure 14:
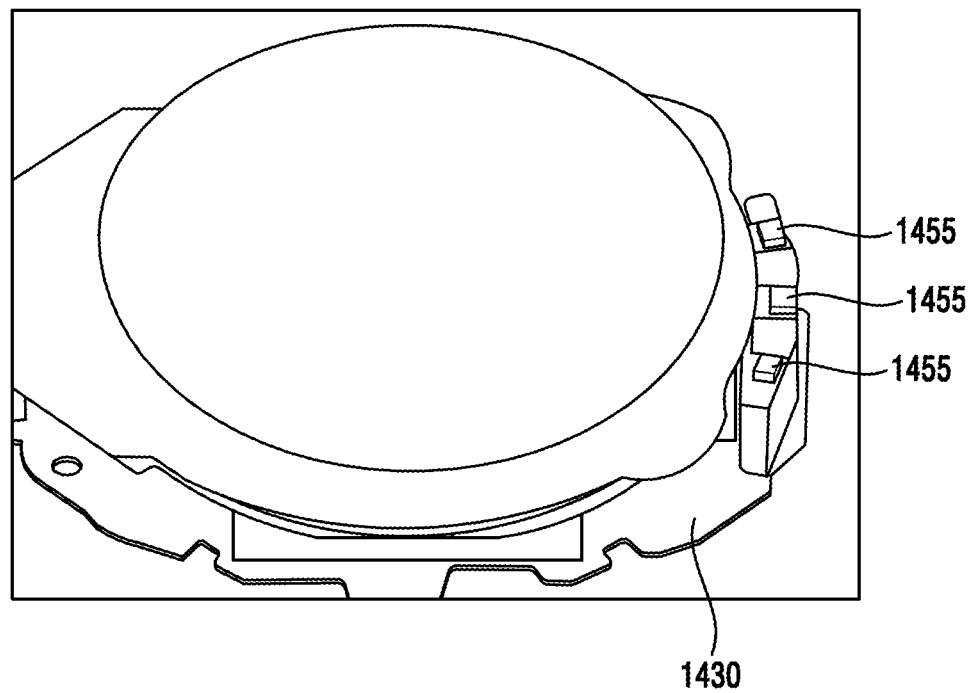
FIG. 14 is a perspective view illustrating a plurality of light reception units arranged on a support structure according to various embodiments of the present disclosure.

FIG. 14 is a perspective view illustrating a plurality of light reception units arranged on a support structure according to various embodiments of the present disclosure.

Referring to FIG. 14, according to various embodiments, one or more light reception units 1455 may be disposed on a support structure 1430. The light reception units 1455 (e.g., light receivers) may be arranged to be spaced apart from each other. Otherwise, the one or more light reception units 1455 may be electrically connected to the main printed circuit board after being mounted on another FPCB (not illustrated). The support structure 1430 may be a support for supporting the light reception units.

Figure 15:
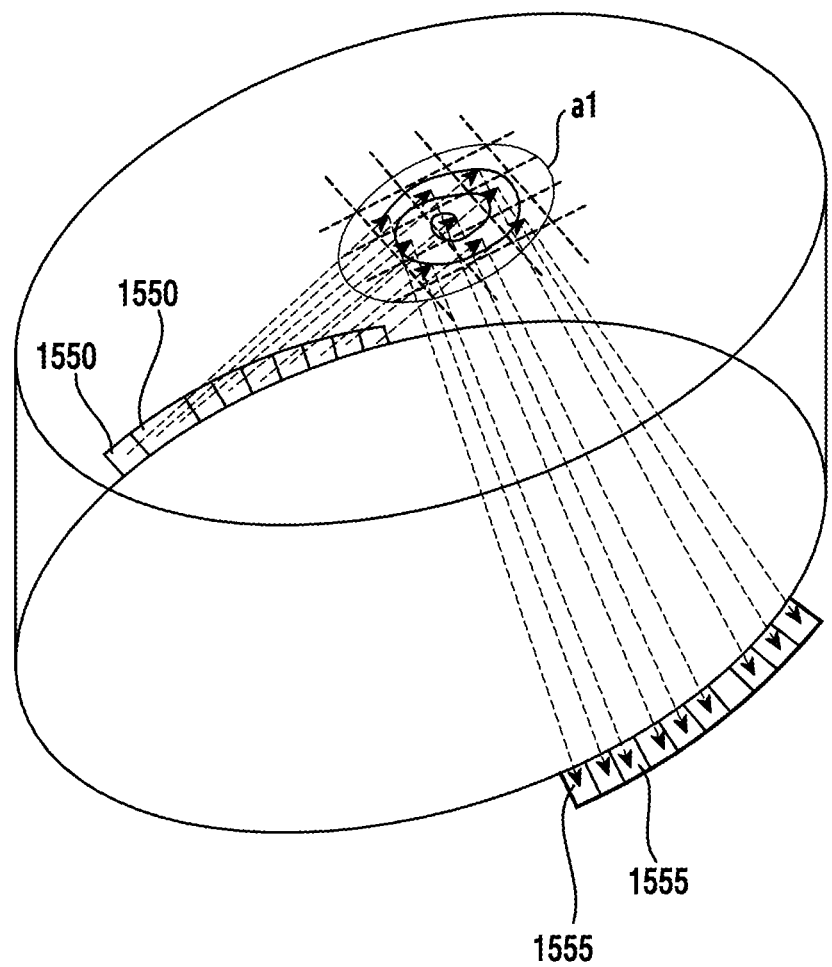
FIG. 15 is a view schematically showing a plurality of light emission units and light reception units configured in the fingerprint recognition sensor, in which respective optical waveguide paths are illustrated, according to various embodiments of the present disclosure.

FIG. 15 is a view schematically showing a plurality of light emission units and light reception units configured in the fingerprint recognition sensor, in which respective optical waveguide paths are illustrated, according to various embodiments of the present disclosure.

Referring to FIG. 15, according to various embodiments, a plurality of light emitting units 1550 (e.g., light emitters) and light reception units 1555 (e.g., light receivers) may be respectively disposed to recognize a fingerprint. The fingerprint recognition device including a single light emission unit and a single light reception unit may not be able to recognize a fingerprint outside a small area in the extent of the area of the reflection member. Accordingly, a plurality of light emission units 1550 and light reception units 1555 are arranged in order to have a sensing area in the extent of recognizing a fingerprint, and each of light paths is configured to have a predetermined recognition area in the horizontal/vertical direction (array type) so that the light beams guided to the first area a1 may constitute a wide sensing region. Depending on an algorithm, a minimum size of 8 mm×4 mm may be required. As the mounting number of light emission units 1550 and light reception units 1555 increases, the fingerprint recognition area can be widened. Reflection members are omitted in the drawing.

Figure 16:
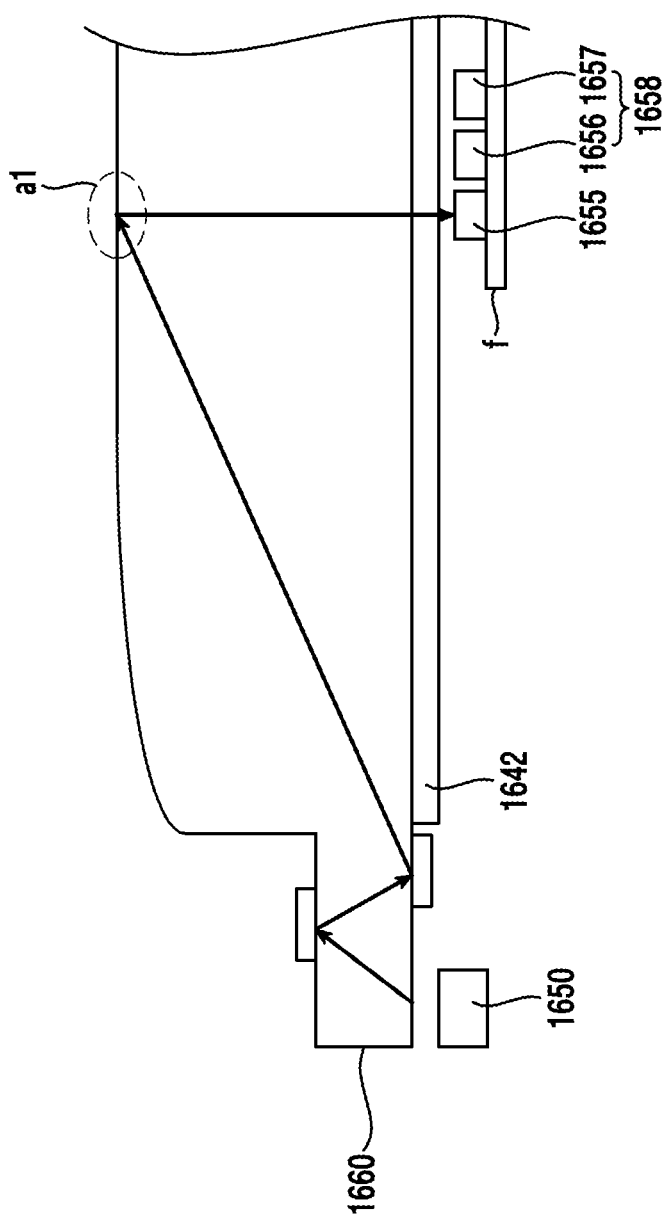
FIG. 16 is view schematically illustrating a configuration of another fingerprint recognition sensor according to various embodiments of the present disclosure.

FIG. 16 is view schematically illustrating a configuration of another fingerprint recognition sensor according to various embodiments of the present disclosure.

Referring to FIG. 16, according to various embodiments, at least one light emission unit 1650 (e.g., light emitter) may be provided on a flange 1660, and at least one light reception unit 1655 (e.g., light receiver) may be provided in a region other than the flange 1660. For example, the at least one light reception 1655 may be disposed in a second direction of (below) the window.

According to various embodiments, the at least one light reception unit 1655 may be disposed at a position below or below a display module so as to face or confront with the first region. According to various embodiments, at least one light reception unit 1655 may be disposed next to another sensor. For example, the another sensor may be an illuminance sensor 1658. For example, the at least one light reception unit may be provided on an FPCB f on which the illuminance sensor 1658 is mounted.

According to various embodiments, the at least one light reception unit 1655 may be disposed in the second direction of the display module 1642 and on the FPCB f in the region that confronts with the first region a1 (the region where a fingerprint is imprinted). For example, the at least one light reception unit 1655 may be disposed adjacent to the light reception unit 1656 and light emission unit 1657 of the illuminance sensor 1658, along the periphery of the light reception unit 1656 and the light emission unit 1657 of the illuminance sensor 1658, or between the light reception unit 1656 and the light emission unit 1657 of the illuminance sensor 1658. According to various embodiments, the at least one light emission unit 1657 may be disposed in a region other than the flange 1660, and the at least one light reception unit 1656 may be disposed on the flange 1660. For example, the at least one light emission unit 1657 may be disposed below the display module, and the at least one light reception unit 1656 may be disposed on the flange.

Figure 17:
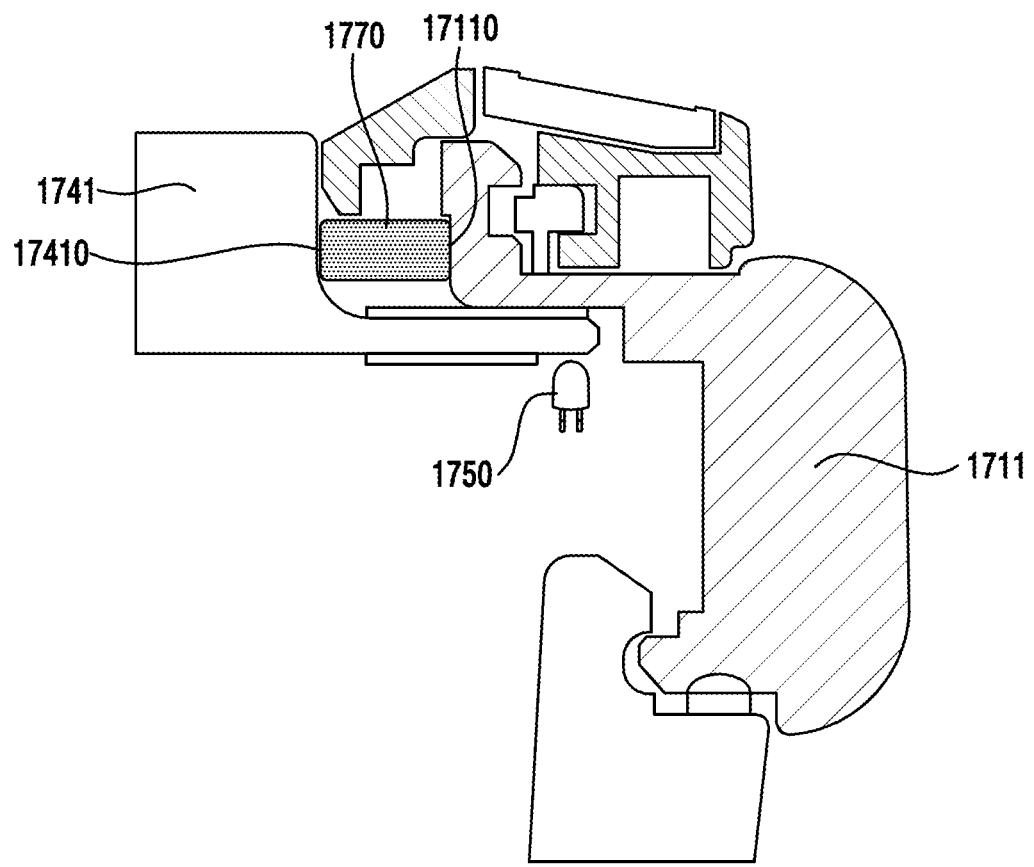
FIG. 17 is view schematically illustrating a configuration of a waterproof structure of the fingerprint recognition sensor according to various embodiments of the present disclosure.

FIG. 17 is view schematically illustrating a configuration of a waterproof structure of the fingerprint recognition sensor according to various embodiments of the present disclosure.

Referring to FIG. 17, according to various embodiments, an electronic device may have a waterproof structure that may be configured by a sealing member 1770. The waterproof structure may be disposed between a side face 17410 of a window 1741 and the inner face 17110 of a case 1711 to be in close contact with the side face 17410 of the window 1741 and the inner face 17110 of the case 1711, thereby preventing the infiltration of foreign matter (e.g., moisture). The light emission unit 1750 (e.g., light emitter) and the light reception unit may be waterproofed by the waterproof structure. Although only the light emission unit 1750 is illustrated in FIG. 17, the light reception unit may be waterproofed by the same structure.

According to various embodiments, the sealing member 1770 may be made of an elastically deformable material, for example, a rubber or a silicone material, and may be disposed in a ring shape. One side of the sealing member 1770 may be in close contact with a side face of the window side 17410 and the other side of the sealing member 1770 may be in close contact with the inner face 17110 of the case, thereby preventing the infiltration of foreign matter into the interior space.

Figure 18A:
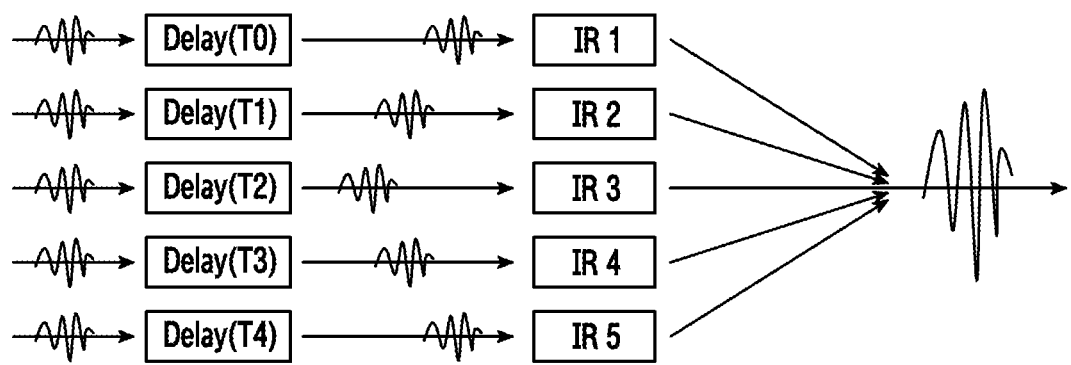
FIG. 18A is a graph illustrating the control and amplification of timings of respective light emission units using a beam-forming technique according to various embodiments of the present disclosure.

FIG. 18A is a graph illustrating the control and amplification of timings of respective light emission units using a beam-forming technique according to various embodiments of the present disclosure.

Figure 18B:
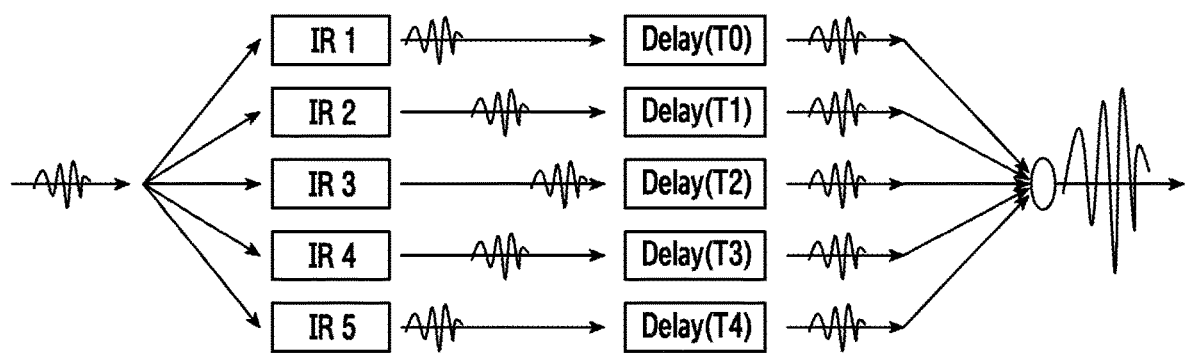
FIG. 18B is a graph illustrating the control and amplification of timings of respective light reception units using a beam-forming technique according to various embodiments of the present disclosure.

FIG. 18B is a graph illustrating the control and amplification of timings of respective light reception units using a beam-forming technique according to various embodiments of the present disclosure. The beam-forming technique means a technique of giving a predetermined time delay to a plurality of channels to be transmitted or received so as to converge the plurality of channels and then transmitting/receiving the plurality of channels as one amplified signal.

Referring to FIGS. 18A and 18B, according to various embodiments, in a case where a plurality of light emission units and light reception units are respectively disposed, when the respective light emission units and light reception units are sequentially controlled using the beam-forming technique, it is possible to increase a fingerprint recognition rate.

It is possible to increase the fingerprint recognition rate by amplifying transmission and reception sensitivity using timing of each of the light emission units (FIG. 18A) and light reception units (FIG. 18B), and then transmitting or receiving the amplified signal.

The above embodiments of the present disclosure may also be implemented as a computer program executed in a computer and may be implemented in a general digital computer which executes the program using a non-transitory computer-readable medium. A data structure used in the above embodiments may be recorded on the computer-readable medium via various means. The computer-readable medium includes storage media such as magnetic storage media (e.g., a read only memory (ROM), floppy disks, hard disks, etc.) and optical recording media (e.g., a compact disc (CD)-ROM, a DVD, etc.).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A wearable-type electronic device comprising:
a housing including:
  a first face facing a first direction,
  a second face facing a second direction that is opposite the first direction, and
  a third face facing a third direction that is perpendicular to each of the first and second directions and enclosing at least a portion of a space between the first and second faces;
a support structure disposed between the first and second faces;
a display disposed on the first face to be exposed, and including:
  a window having a first flange,
  a second flange disposed to be opposite the first flange, and
  a display module coupled to the window to face the second direction,
  the display being disposed on a face of the support structure;
a first printed circuit board disposed on another face of the support structure;
at least one light emitter mounted adjacent to the first flange, and configured to emit light to a first region of the window; and
at least one light receptor mounted adjacent to the second flange, and configured to receive light reflected from the first region.

2. The wearable-type electronic device of claim 1, wherein each of the first and second flanges is formed on an outer circumferential portion extending in an outer circumferential direction of the window, and wherein each of the first and second flanges is positioned on an outer circumference of the display module.

3. The wearable-type electronic device of claim 1, wherein the light includes infrared light, and the light emitter and the light receptor constitute a fingerprint recognition sensor.

4. The wearable-type electronic device of claim 1, wherein the first and second flanges are respectively configured as first and second waveguides so that light emitted from the first light emitter is guided to the first region by the first waveguide, or light guided from the first region is guided to the light receptor by the second waveguide.

5. The wearable-type electronic device of claim 4,
wherein the at least one light emitter comprises a plurality of light emitters and the at least one light receptor comprises a plurality of light receptors that are respectively arranged in array types to provide a region capable of recognizing a fingerprint in the first region, and
wherein the first region is a fingerprint contact region, which is an active region of the display module, and includes a central region of a surface located in a first direction of the window.

6. The wearable-type electronic device of claim 1,
wherein the first flange includes a first outer circumferential face that faces the first direction, a second outer circumferential face that faces the second direction, and a third outer circumferential face that faces the third direction,
wherein the first outer circumferential face is provided with at least one first reflection structure, and the second outer circumferential face is provided with at least one second reflection structure,
wherein the second flange includes a fourth outer circumferential face that faces the first direction, a fifth outer circumferential face that faces the second direction, and a sixth outer circumferential face that faces the third direction, and
wherein the fourth outer circumferential face is provided with at least one third reflection structure, and the fifth outer circumferential face is provided with at least one fourth reflection structure.

7. The wearable-type electronic device of claim 6,
wherein the first reflection structure includes at least one first reflection member disposed on the first outer circumferential face,
wherein the second reflection structure includes at least one second reflection member disposed on the second outer circumferential face and configured to reflect light reflected by the first reflective member such that the light is guided to the first region, and
wherein the first reflection structure includes a first metal layer deposited on the first outer circumferential face, and the second reflection structure includes a second metal layer deposited on a second outer circumferential face.

8. The wearable-type electronic device of claim 7,
wherein the first metal layer includes a first light-shielding layer printed on a face facing the first direction, and
wherein the second metal layer further includes a second light-shielding layer printed on a face facing the second direction.

9. The wearable-type electronic device of claim 8, further comprising:
a first UV molding layer located between the first outer circumferential face and the first metal layer and facing the second direction; and
a second UV molding layer located between the second outer circumferential face and the second metal layer.

10. The wearable-type electronic device of claim 6,
wherein the first flange further includes at least one first light refraction structure on the first outer circumferential face and the second flange further includes at least one second refraction structure on the second outer circumferential face, and
wherein each of the first and second light refraction structures is formed by thickening or etching a portion from which light is reflected.

11. The wearable-type electronic device of claim 10, wherein the first and second light reflection structures further include first and second reflection sheets, respectively.

12. The wearable-type electronic device of claim 1, wherein the at least one light emitter is disposed on a display flexible printed circuit board that electrically connects the display to the first printed circuit board.

13. The wearable-type electronic device of claim 1,
wherein the at least one light receptor is disposed on the support structure, and
wherein the at least one light receptor is electrically connected to the first printed circuit board by using a second printed circuit board.

14. The wearable-type electronic device of claim 1,
wherein the window includes a rotary wheel disposed on an outer circumference so as to input data, and
wherein the rotary wheel and the first and second flanges are stacked one on another to face each other.

15. The wearable-type electronic device of claim 6, wherein each of the at least one light emitter is disposed adjacent to one of the first to third outer circumferential faces or is disposed such that a light outlet portion thereof is disposed to be directed to any one of the first to third outer circumferential faces.

16. A wearable-type electronic device comprising:
a housing including:
a first face facing a first direction,
a second face facing a second direction that is opposite the first direction, and
a third face facing a third direction that is perpendicular to each of the first and second directions and enclosing at least a portion of a space between the first and second faces;
a pair of straps configured to enable the housing to be worn on a wrist;
a display including:
a window disposed on the first face to be exposed and including a first flange,
a second flange disposed to be opposite the first flange, and
a display module coupled to the window to face the second direction; and
a fingerprint recognition sensor mounted on each of the first and second flanges,
wherein the fingerprint recognition sensor comprises:
at least one light emitter mounted adjacent to the first flange to emit light to a first region of the window, and
at least one light receptor mounted adjacent to the second flange to receive light reflected from the first region.

17. The wearable-type electronic device of claim 16,
wherein the first flange is a first waveguide of light emitted from the light emitter, and
wherein the second flange is a second waveguide in which light reflected from a fingerprint contact region is guided to the light receptor.

18. A wearable-type electronic device comprising:
a housing including:
a first face facing a first direction,
a second face facing a second direction that is opposite the first direction, and
a third face facing a third direction that is perpendicular to each of the first and second directions and enclosing at least a portion of a space between the first and second faces;
a pair of straps configured to enable the housing to be worn on a wrist;
a display including:
a window disposed on the first face to be exposed and including a flange region and a non-flange region, and
a display module coupled to the window to face the second direction;
at least one light emitter disposed on the flange region to emit light to a first region of the window; and
at least one light receptor disposed on the non-flange region to receive light reflected from the first region.

19. The wearable-type electronic device of claim 18,
wherein the at least one light receptor is arranged opposite to the first region in the second direction of the display module, and
wherein the at least one light receptor is arranged next to a sensor.

20. The wearable-type electronic device of claim 19, wherein the sensor includes an illuminance sensor.

* * * * *